US011940614B2

(12) United States Patent
Glines et al.

(10) Patent No.: US 11,940,614 B2
(45) Date of Patent: Mar. 26, 2024

(54) REMOVABLY ATTACHABLE EYE COVER SYSTEM

(71) Applicants: Jeff Glines, St. George, UT (US); Braxen Glines, St. George, UT (US)

(72) Inventors: Jeff Glines, St. George, UT (US); Braxen Glines, St. George, UT (US)

( * ) Notice: Subject to any disclaimer, the term of this patent is extended or adjusted under 35 U.S.C. 154(b) by 249 days.

(21) Appl. No.: 17/317,000

(22) Filed: May 11, 2021

(65) Prior Publication Data
US 2021/0349302 A1    Nov. 11, 2021

Related U.S. Application Data

(60) Provisional application No. 63/023,043, filed on May 11, 2020.

(51) Int. Cl.
*G02B 23/16*    (2006.01)

(52) U.S. Cl.
CPC .................... *G02B 23/16* (2013.01)

(58) Field of Classification Search
CPC ........ G02B 23/00; G02B 23/16; G02B 23/20; G02B 23/22; G02B 7/00; G02B 7/02; G02B 7/023; G02B 7/20; G02B 7/22; G02B 27/00; G02B 27/0006
USPC ................ 359/507, 511–513, 399, 600–601, 359/611–612
See application file for complete search history.

(56) References Cited

U.S. PATENT DOCUMENTS

| | | | | |
|---|---|---|---|---|
| 4,824,235 A * | 4/1989 | Eddy | ...................... | G02B 23/16 351/200 |
| 6,226,134 B1 * | 5/2001 | Davis | ..................... | G02B 23/16 359/822 |
| 7,762,664 B2 * | 7/2010 | Fink | ......................... | A61B 3/16 351/200 |
| 2014/0153101 A1 * | 6/2014 | Holding | ................... | G02B 7/00 359/610 |
| 2017/0285334 A1 * | 10/2017 | Meade | ..................... | G02B 7/02 |

* cited by examiner

*Primary Examiner* — Thong Q Nguyen
(74) *Attorney, Agent, or Firm* — Gurr Brande & Spendlove, PLLC; Robert A. Gurr

(57) ABSTRACT

The eye cover system has a scope attachment portion, an adjustment portion, and an eye cover portion. The scope attachment portion is arched so as to receive a cylindrical eyepiece of a spotting scope. The scope attachment portion couples to the eyepiece via an adjustable elastic band. Further, the scope attachment portion is coupled to a shaft that receives the eye cover portion. The eye cover portion comprises a removably attachable hood with a protrusion that receives the shaft through a slide aperture. In use, the unused eye's view is blocked by the hood.

3 Claims, 23 Drawing Sheets

REMOVABLY ATTACHABLE EYE COVER SYSTEM

CROSS-REFERENCE TO RELATED APPLICATIONS

This application claims the benefit of U.S. Provisional Application Ser. No. 63/023,043, filed on May 11, 2020, which is incorporated herein by reference.

TECHNICAL FIELD

The present disclosure relates to an eye cover. More particularly, the present disclosure relates to an eye cover that couples to a spotting scope, monoscope, or other scope to reduce or prevent eye fatigue of the eye that is not looking through the scope.

BACKGROUND

Spotting scopes, monoculars, telescopes, etc. have been used for years to view objects in the distance. For example, hunters and bird watchers have been using spotting scopes for years to spot animals and birds at a distance. Hours, and sometimes days, are spent sitting behind a spotting scope strategically viewing hillsides and mountain ranges. This can become extremely exhausting for a user due to the strain, blurred vision, and fatigue that is placed on the user's eyes. Often, the fatigue and strain come from not being able to block the view of the unused eye. Users may try to close their unused eye; however, this can cause strain and fatigue. Because of this, some users have tried to keep both eyes open while viewing through a spotting scope only to have similar results, such as eye fatigue. Further, many people tend to switch from dominant eye to non-dominant eye trying to prevent eye fatigue and facial muscle cramps, which leads to a non-effective way to keep an eye on the intended object.

Some attempts have been made to address these issues, such as an eye patch with an elastic around the head, a blinder clipped onto a hat to try and block the unused eye, and adding two lenses for both eyes, that attach to a spotting scope for the purpose of seeing through the scope. Even with the attempts to solve the issue of eye fatigue, there are many shortcomings that may be found in these attempts. Specifically, the eye patch around a user's head has to be removed if both eyes are needed quickly, and it is very uncomfortable to wear. The blinder, clipped onto a hat, does not seal off the user's eye from sunlight and the user has to be wearing a hat to use the blinder. Lastly, the two lenses for both eyes (binocular style), which couples to a spotting scope, is only compatible with a limited number of scopes and is not adaptable to the other various scope products on the market. Even if the two lens system was adaptable to more than one scope, it is very cost prohibitive and requires adding additional lenses to the scope, making transport and storage more difficult.

Accordingly, there is a need for a removably attachable eye cover that prevents eye fatigue when using a monoscope, spotting scope, telescope, microscope, etc., is simple to use, blocks light from the eye, is inexpensive, and is adjustable to fit any user and any size or brand of scope. The present disclosure seeks to solve these and other problems.

SUMMARY OF EXAMPLE EMBODIMENTS

In one embodiment, a removably attachable eye cover system (hereinafter referred to as the "eye cover system") comprises a scope attachment portion, an adjustment portion, and an eye cover portion. The scope attachment portion comprises an eyepiece coupler that is arched so as to receive a cylindrical eyepiece of, for example, a spotting scope. The eyepiece coupler attaches to the eyepiece of the spotting scope via an adjustable elastic band. The adjustment portion comprises a shaft with a cylindrical section at a proximal end to the spotting scope that is hingedly coupled to the eyepiece coupler. The adjustment portion further comprises a slidably adjustable coupler that is received by the shaft via a slide aperture, which allows the eye cover portion to move linearly along the shaft to adjust to the width between a user's eyes. The slidably adjustable coupler receives the eye cover portion. In particular, the eye cover portion comprises an adjustable hood attachment that is hingedly coupled to the slidably adjustable coupler and magnetically coupleable to a removably attachable hood that covers the user's unused eye.

In one method of use, the eye cover system may be adjusted to act as an eyepiece lens cover for a spotting scope.

In one embodiment, an eye cover system comprises a scope attachment portion, an adjustment portion, and an eye cover portion. The scope attachment portion is arched so as to receive a cylindrical eyepiece of a spotting scope. The scope attachment portion couples to the eyepiece via an adjustable elastic band. Further, the scope attachment portion is coupled to a shaft that receives the eye cover portion. The eye cover portion comprises a removably attachable hood with a protrusion that receives the shaft through a slide aperture.

In one embodiment, an eye cover system comprises a removably attachable hood and an adjustment wire that wraps around a spotting scope.

In one embodiment, an eye cover system comprises a scope attachment portion, an adjustment portion, and an eye cover portion. The scope attachment portion is arched so as to receive a cylindrical eyepiece of a spotting scope. The scope attachment portion couples to the eyepiece via an adjustable elastic band. Further, the scope attachment portion is coupled to a shaft that receives the eye cover portion. The eye cover portion comprises a removably attachable hood with a protrusion that receives the shaft through a slide aperture. The scope attachment portion and the adjustable elastic band may be combined into a single tightening band that may be adjustable using a threaded knob. In other words, the user would place the tightening band around the eyepiece and then tighten it using threaded knob so that it is secured to the eyepiece.

DETAILED DESCRIPTION OF EXAMPLE EMBODIMENTS

Figure 1:
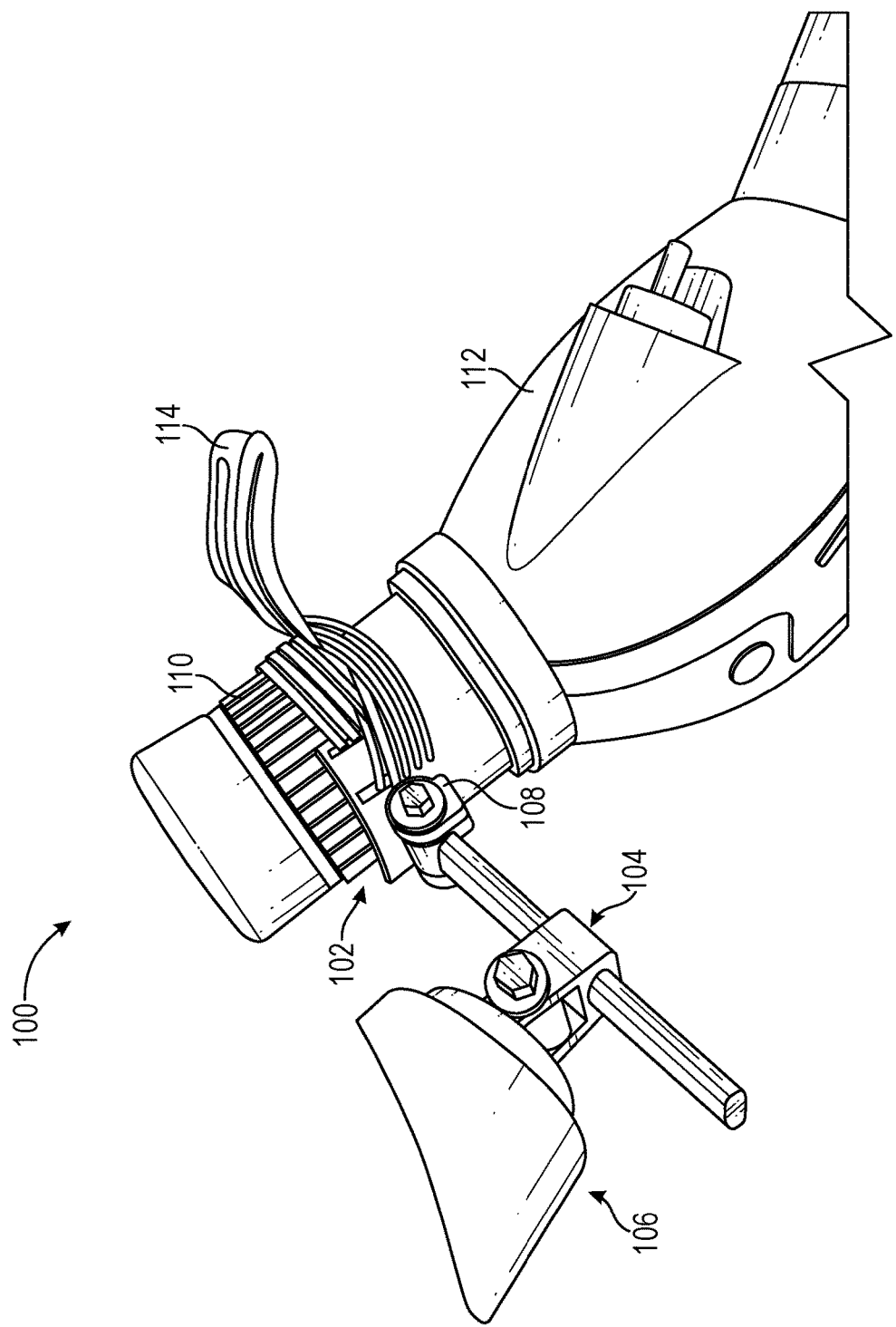
FIG. 1 illustrates a rear, side perspective view of an eye cover system.
Figure 2:
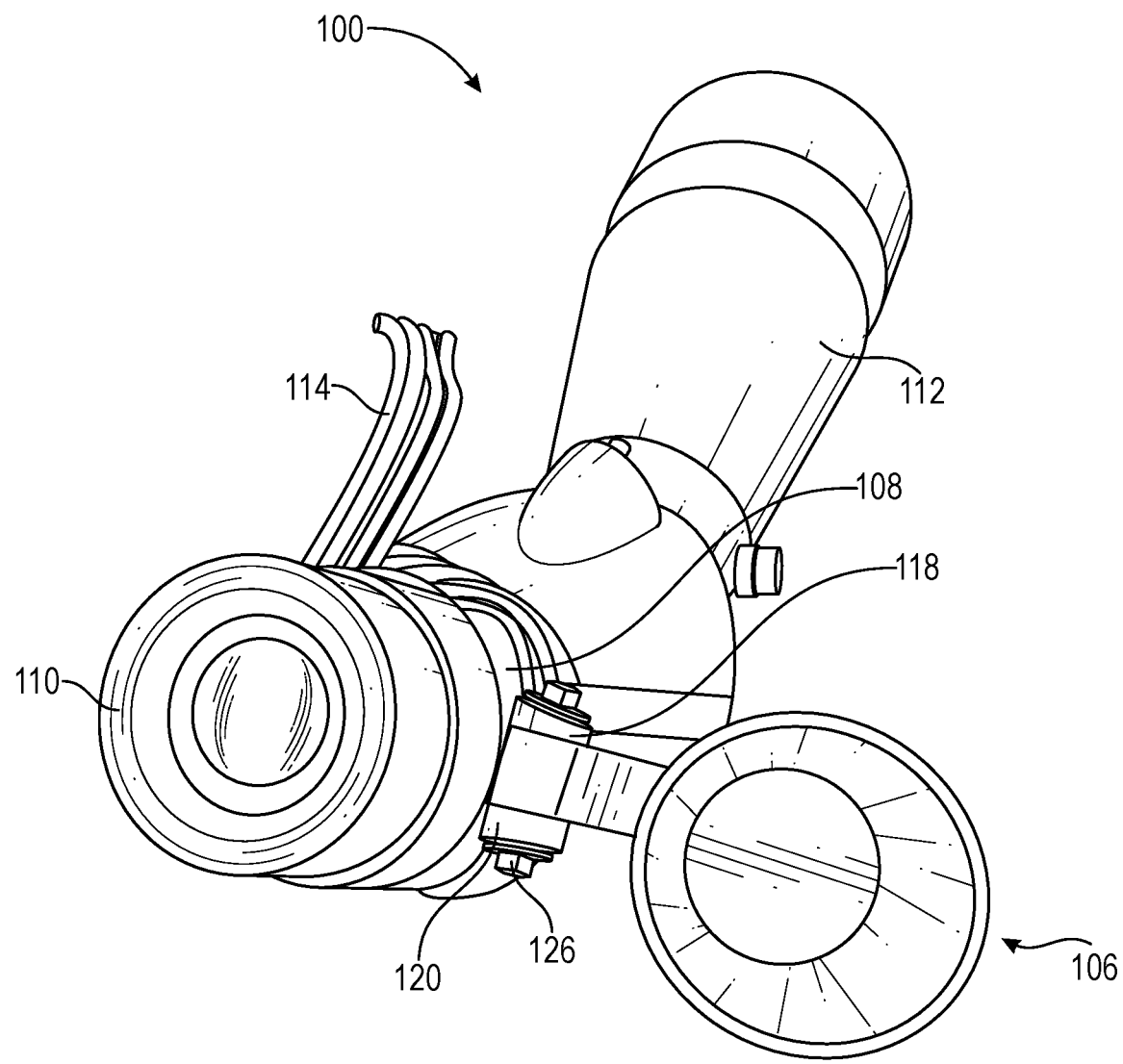
FIG. 2 illustrates a rear perspective view of an eye cover system.
Figure 3:
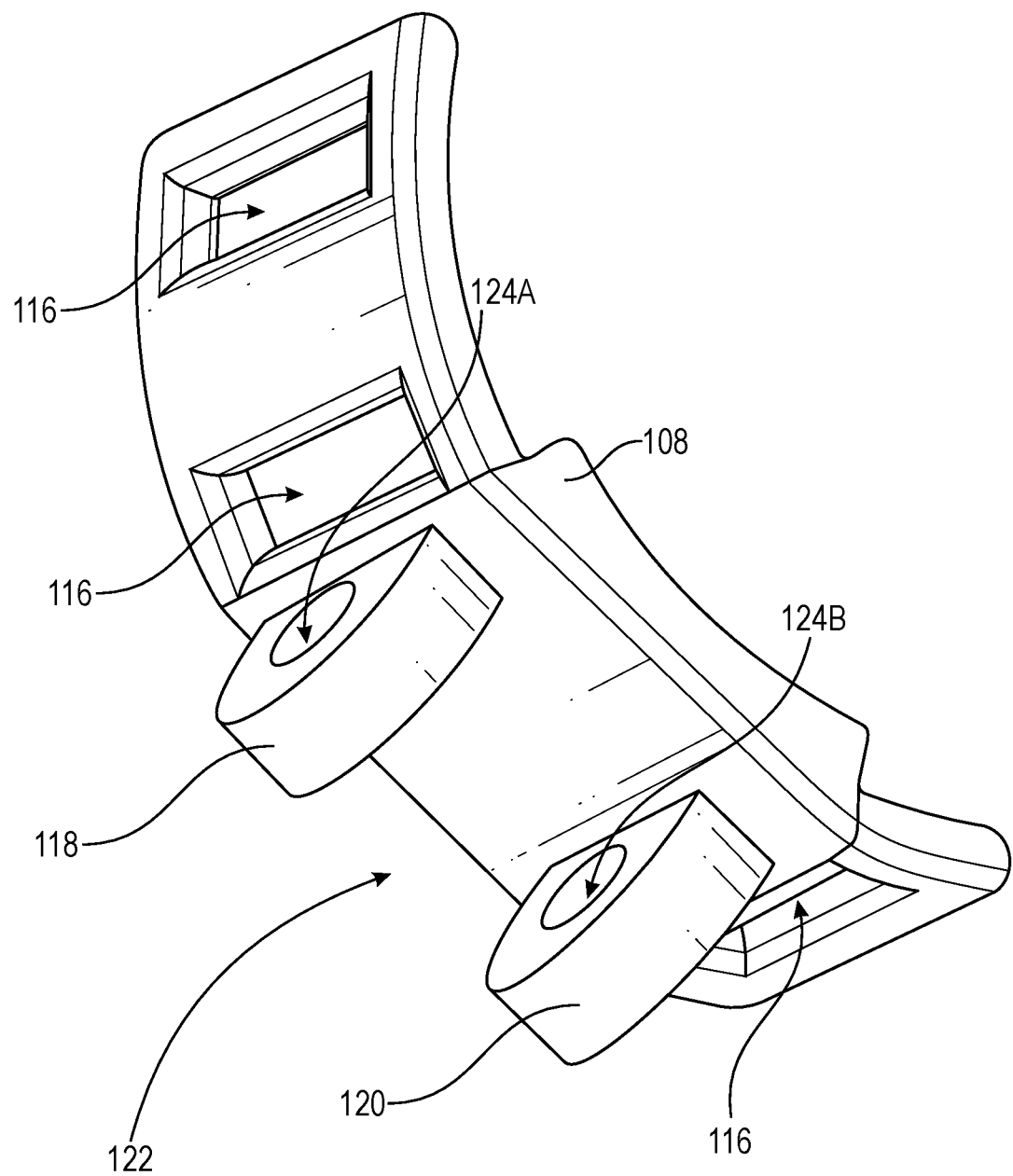
FIG. 3 illustrates a rear perspective view of an eyepiece coupler of an eye cover system.
Figure 4:
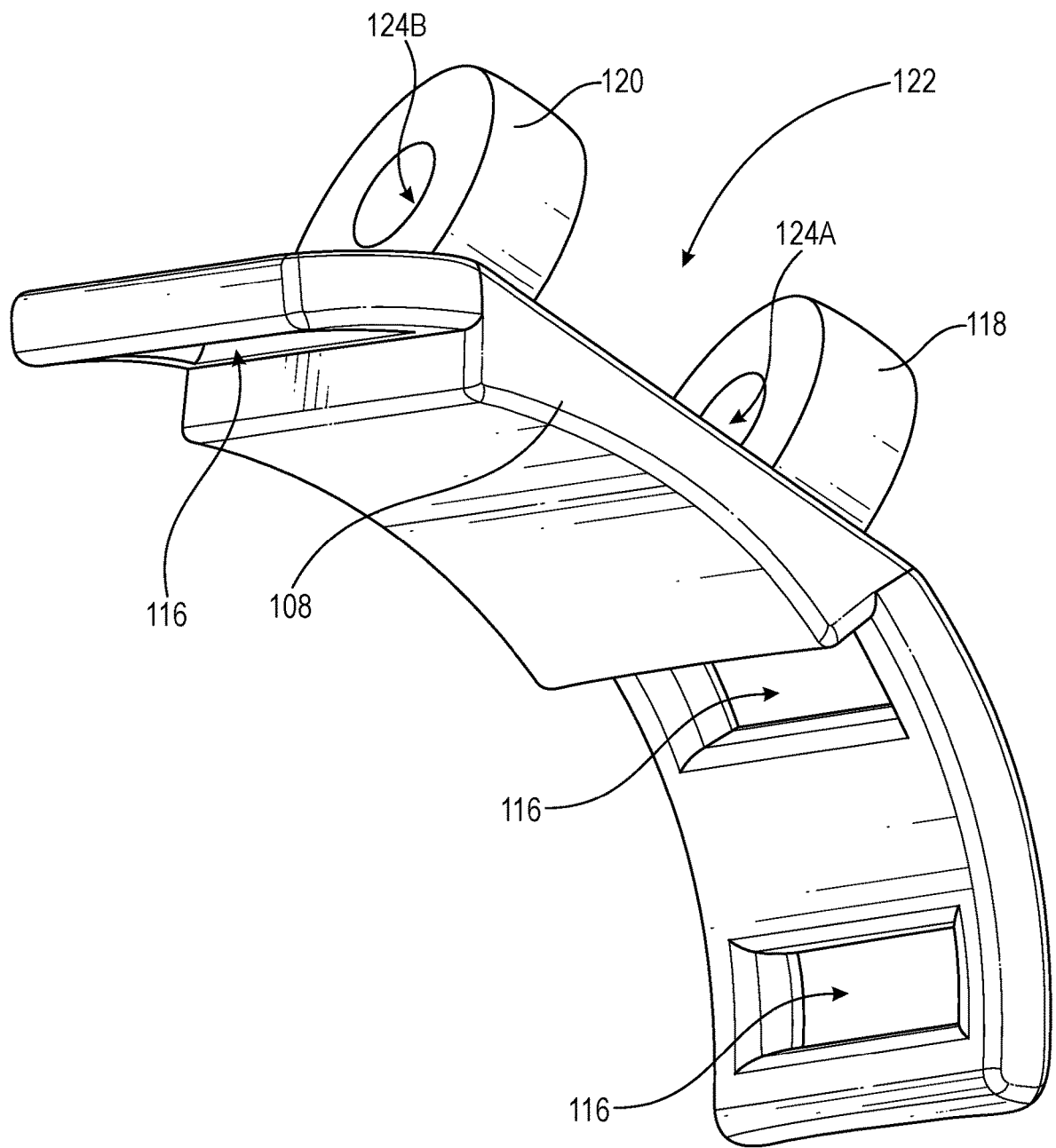
FIG. 4 illustrates a front perspective view of an eyepiece coupler of an eye cover system.

The following descriptions depict only example embodiments and are not to be considered limiting in scope. Any reference herein to "the invention" is not intended to restrict or limit the invention to exact features or steps of any one or more of the exemplary embodiments disclosed in the present specification. References to "one embodiment," "an embodiment," "various embodiments," and the like, may indicate that the embodiment(s) so described may include a particular feature, structure, or characteristic, but not every embodiment necessarily includes the particular feature, structure, or characteristic. Further, repeated use of the phrase "in one embodiment," or "in an embodiment," do not necessarily refer to the same embodiment, although they may.

Reference to the drawings is done throughout the disclosure using various numbers. The numbers used are for the convenience of the drafter only and the absence of numbers in an apparent sequence should not be considered limiting and does not imply that additional parts of that particular embodiment exist. Numbering patterns from one embodiment to the other need not imply that each embodiment has similar parts, although it may.

Accordingly, the particular arrangements disclosed are meant to be illustrative only and not limiting as to the scope of the invention, which is to be given the full breadth of the appended claims and any and all equivalents thereof. Although specific terms are employed herein, they are used in a generic and descriptive sense only and not for purposes of limitation. Unless otherwise expressly defined herein, such terms are intended to be given their broad, ordinary, and customary meaning not inconsistent with that applicable in the relevant industry and without restriction to any specific embodiment hereinafter described. As used herein, the article "a" is intended to include one or more items. When used herein to join a list of items, the term "or" denotes at least one of the items, but does not exclude a plurality of items of the list. For exemplary methods or processes, the sequence and/or arrangement of steps described herein are illustrative and not restrictive.

It should be understood that the steps of any such processes or methods are not limited to being carried out in any particular sequence, arrangement, or with any particular graphics or interface. Indeed, the steps of the disclosed processes or methods generally may be carried out in various sequences and arrangements while still falling within the scope of the present invention.

The term "coupled" may mean that two or more elements are in direct physical contact. However, "coupled" may also mean that two or more elements are not in direct contact with each other, but yet still cooperate or interact with each other.

The terms "comprising," "including," "having," and the like, as used with respect to embodiments, are synonymous, and are generally intended as "open" terms (e.g., the term "including" should be interpreted as "including, but not limited to," the term "having" should be interpreted as "having at least," the term "includes" should be interpreted as "includes, but is not limited to," etc.).

As previously discussed, there is a need for an eye cover that prevents eye fatigue when using a monoscope, spotting scope, telescope etc., is simple to use, blocks light, is inexpensive, and adjustable to fit any user and any size or brand of scope. The present disclosure seeks to solve these and other problems.

Generally, the eye cover system disclosed herein attaches to a spotting scope, or any other type of scope, to provide eye relief to a user. A removably attachable hood covers an unused eye when viewing through the spotting scope. The removably attachable hood may be hingedly coupled to a shaft to provide adjustment for each individual. It is important that micro adjustments can be made so that light will not enter the user's unused eye. The removably attachable hood may be coupled to the eye cover scope system by using magnets, allowing a user to easily remove the hood and replace it with a different size or form of hood. Further, the eye cover system has the ability to be adjustable no matter the size and shape of the scope. While generally described herein as being removable, it will be appreciated that, in at least one embodiment, the eye cover need not be removable and may be integral.

It will be appreciated that the eye cover system disclosed herein provides relief for a user when looking through a spotting scope for many hours. It will further be appreciated that the eye cover scope system is adjustable to any user, thereby preventing light from entering the eye and, ultimately, preventing eye fatigue.

As shown in FIGS. 1-4, in one embodiment, an eye cover system 100 comprises a scope attachment portion 102, an adjustment portion 104, and an eye cover portion 106. The scope attachment portion 102 comprises an eyepiece coupler 108 that is arched so as to receive a cylindrical eyepiece 110 on, for example, a spotting scope 112. In other embodiments, the eyepiece coupler 108 may be padded where it contacts the eyepiece of a spotting scope, allowing it to conform to various shapes while avoiding scratches. Yet, in other embodiments, the eyepiece coupler 108 may have rubber where it contacts the eyepiece so as to create a tight contact point. Although a spotting scope 112 is illustrated, any other scope may be used, such as a monoscope, telescope, microscope, etc. The eyepiece coupler 108 attaches to the eyepiece 110 of the spotting scope 112 via an adjustable elastic band 114, or any other securement mechanism capable of securing the eye cover system 100 to the spotting scope 112, such as a strap, hook and loop, magnet, or other.

Specifically, the adjustable elastic band 114 is coupled to the eyepiece coupler 108 by utilizing a plurality of slits 116. For example, the adjustable elastic band 114 may be inserted into, and weave through, the plurality of slits 116 (FIG. 3) so as to attach the eyepiece coupler 108 to the spotting scope 112 by wrapping the adjustable elastic band 114 around the eyepiece 110 of the spotting scope 112. On a side facing away from the spotting scope 112, the eyepiece coupler 108 comprises a first protrusion 118, a second protrusion 120, and an aperture 122 extending between the first and second protrusion 118, 120. The first protrusion 118 comprises a first aperture 124A and the second protrusion 120 comprises a second aperture 124B to receive a fastener 126, such as a bolt with a wingnut or nut, pins, or any other quick adjusting securing hardware, therethrough. It will be appreciated that, in some embodiments, the eyepiece coupler 108 may comprise a plurality of apertures and a plurality of protrusions.

Figure 5:
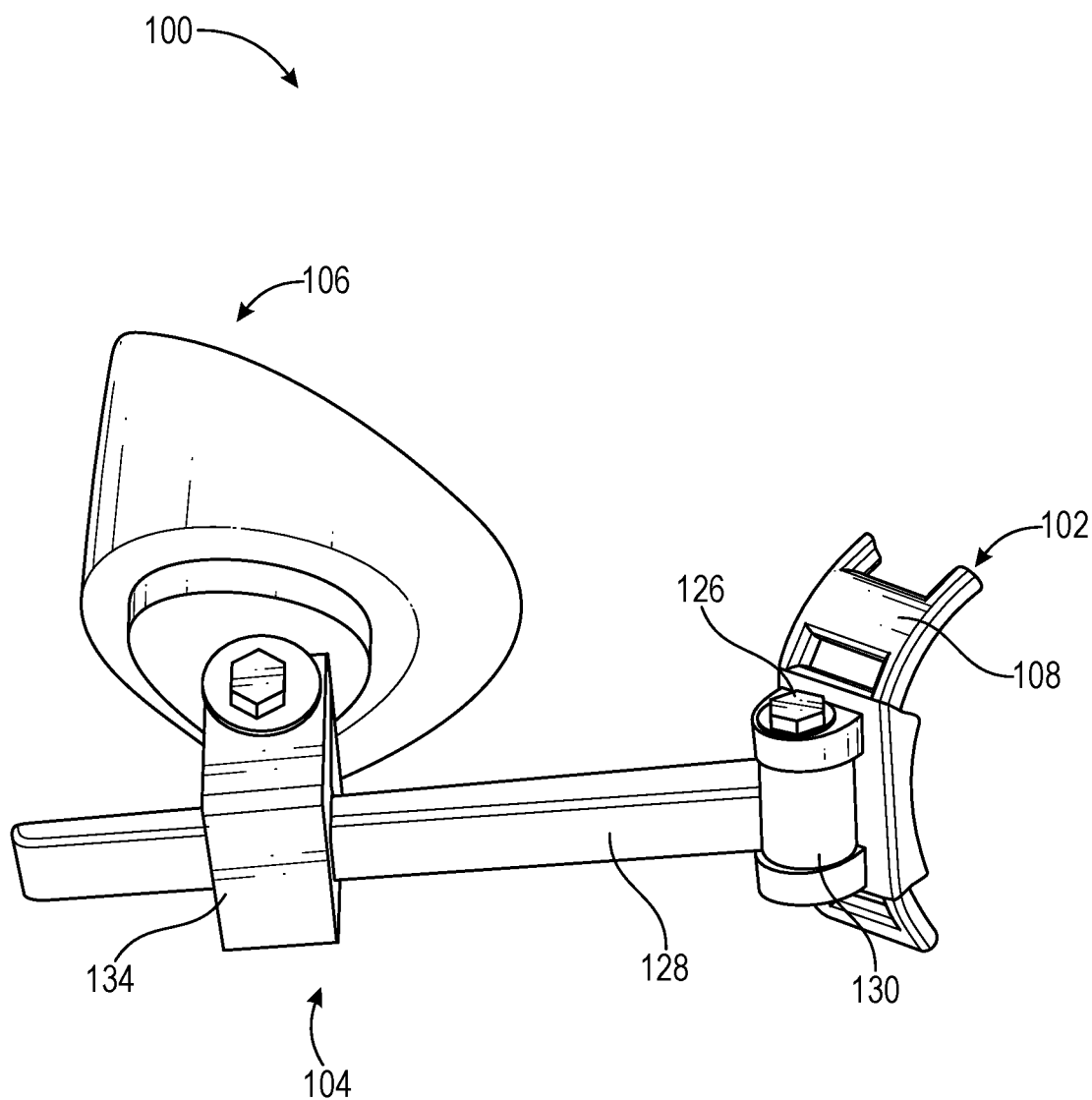
FIG. 5 illustrates a top, front perspective view of an eye cover system.
Figure 6:
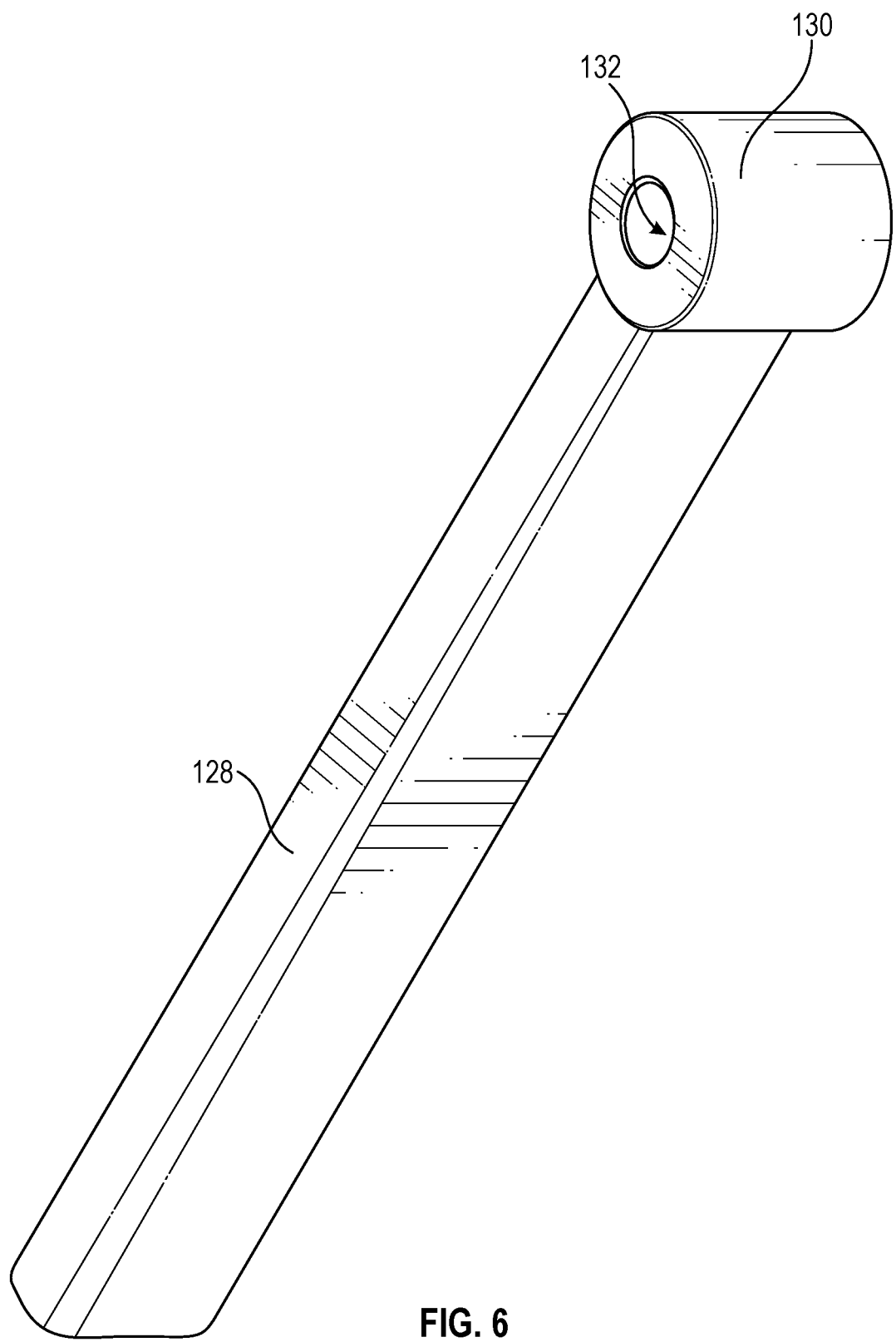
FIG. 6 illustrates a side perspective view of a shaft of an eye cover system.
Figure 7:
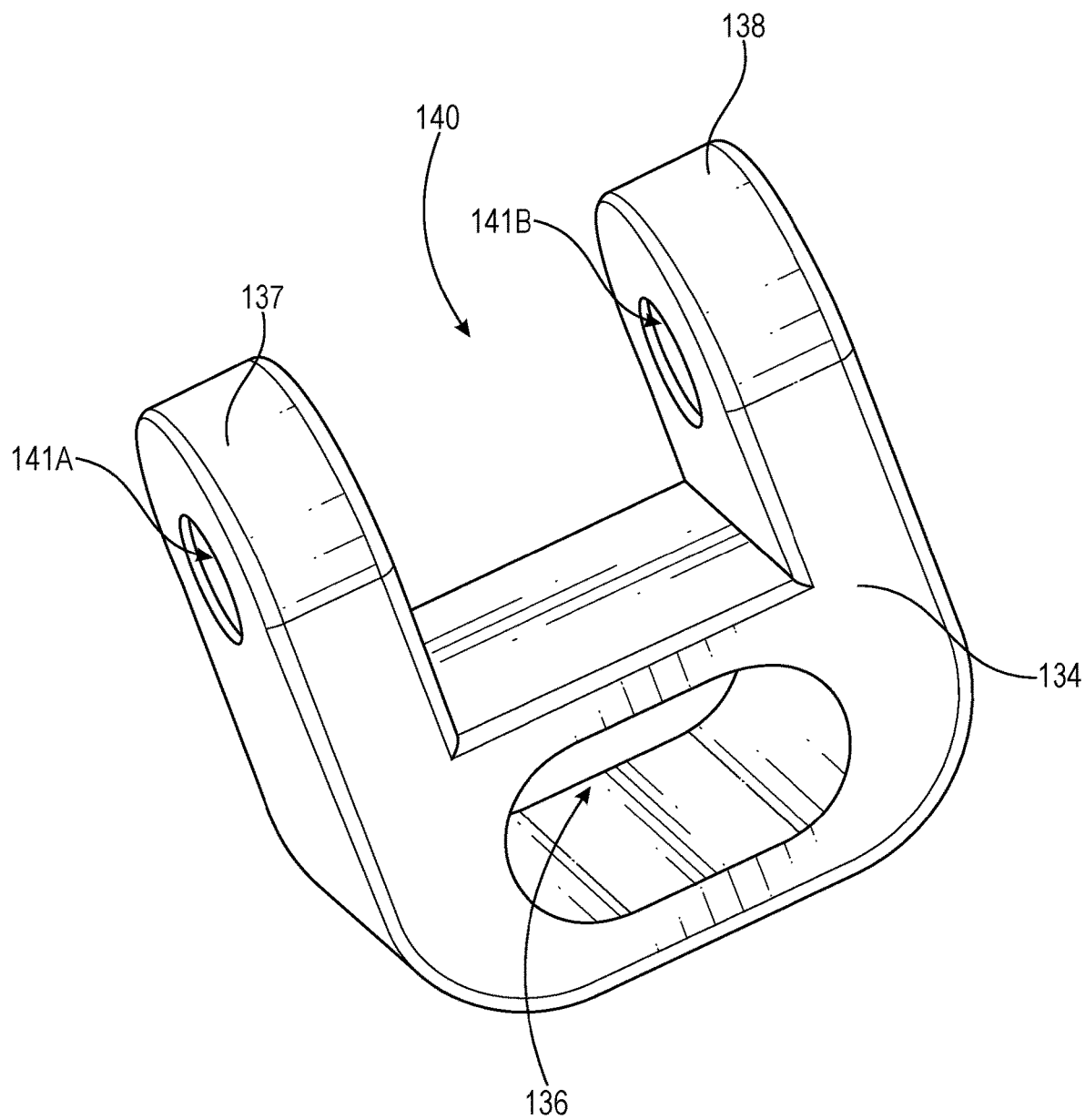
FIG. 7 illustrates a slidably adjustable coupler of an eye cover system.
Figure 8:
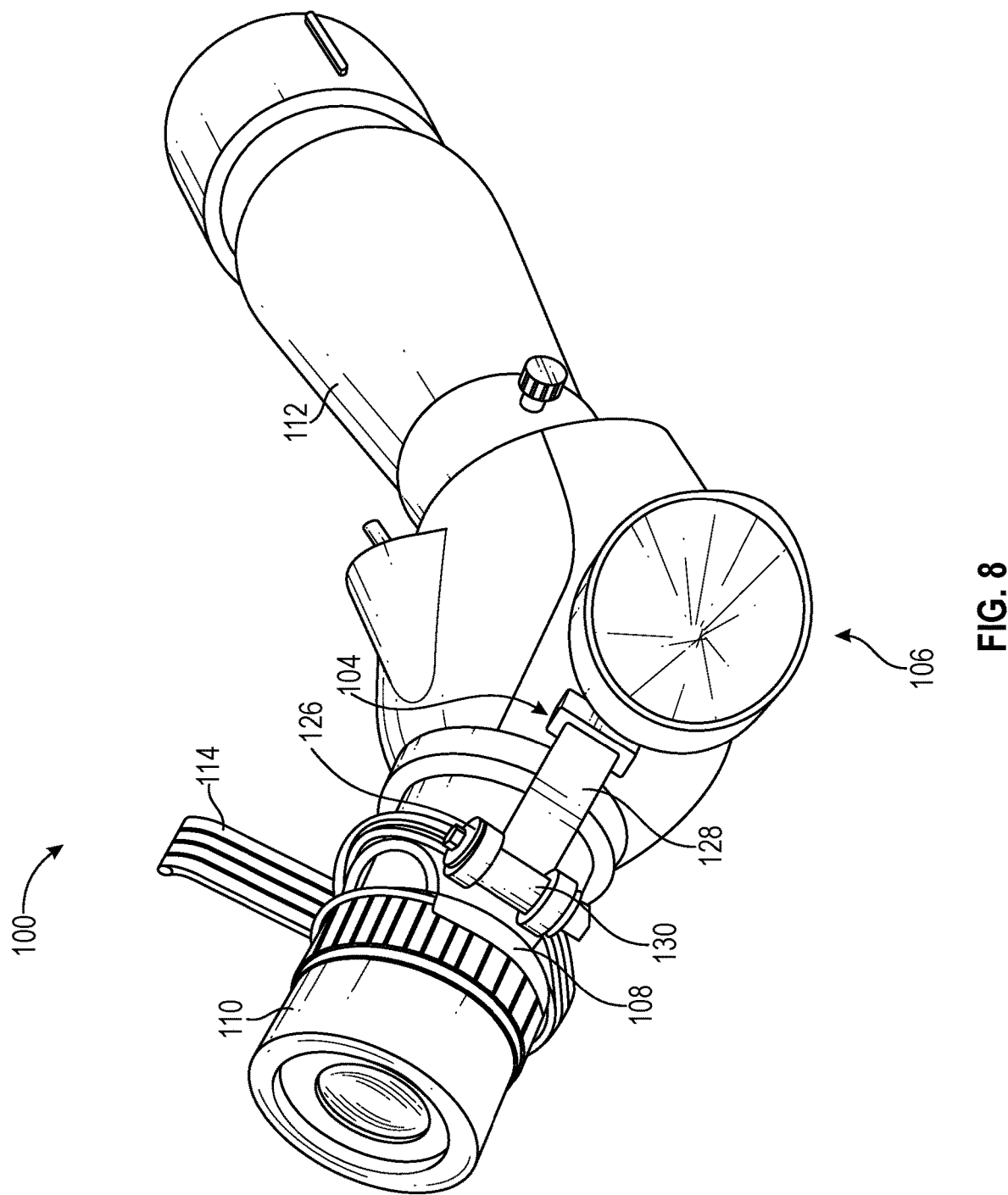
FIG. 8 illustrates a rear perspective view of an eye cover system in an open configuration.

Referring to FIGS. 5-7, the adjustment portion 104 comprises a shaft 128 with a cylindrical section 130, at a proximal end to the spotting scope 112, that is hingedly coupled to the eyepiece coupler 108. More specifically, the cylindrical section 130 is positioned in the aperture 122 and is interposed between the first and second protrusions 118, 120. The cylindrical section 130 further comprises a hinge aperture 132 (FIG. 6) so that the fastener 126 (e.g., a bolt) may be placed through the first aperture 124A (shown in FIGS. 3-4), the hinge aperture 132, and the second aperture 124B (shown in FIGS. 3-4), allowing the shaft 128 to be hingedly coupled to the eyepiece coupler 108. In other words, the cylinder 130 may swivel/pivot when coupled to the eyepiece coupler 108, depending upon the tightness of the bold 126 therein. In an alternate embodiment, the cylindrical section 130 may be divided into a plurality of sections so as to be inserted into multiple apertures.

Figure 9:
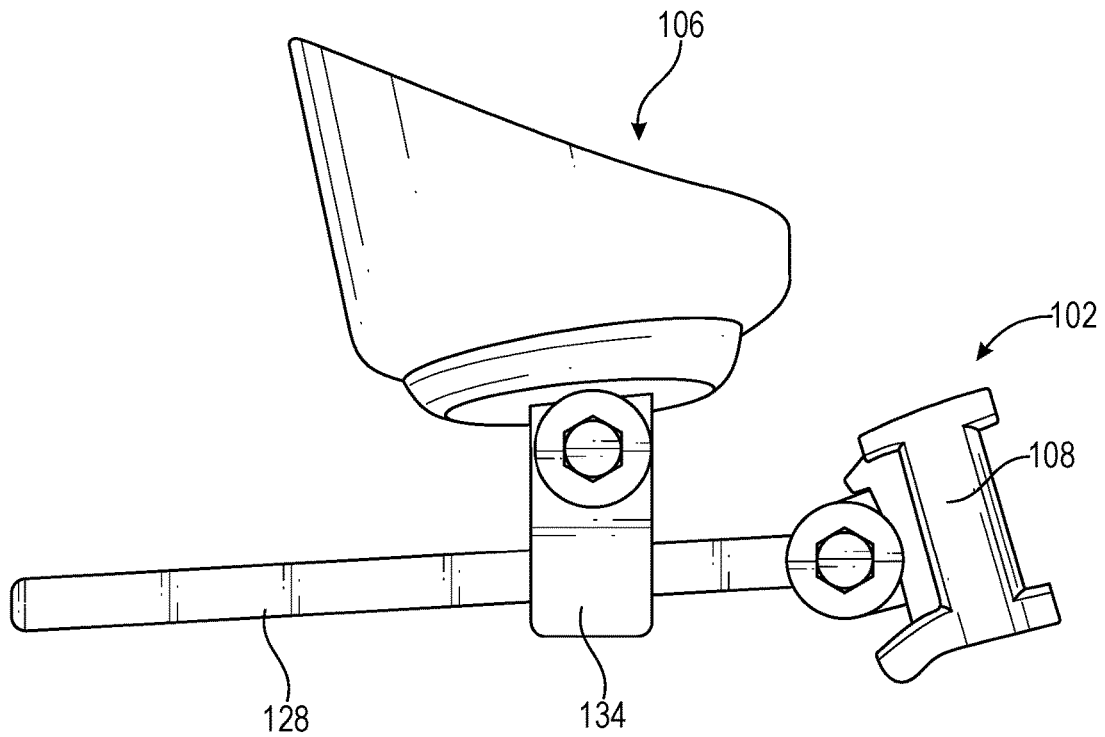
FIG. 9 illustrates a top plan view of an eye cover system with an eye cover portion in a first position.
Figure 10:
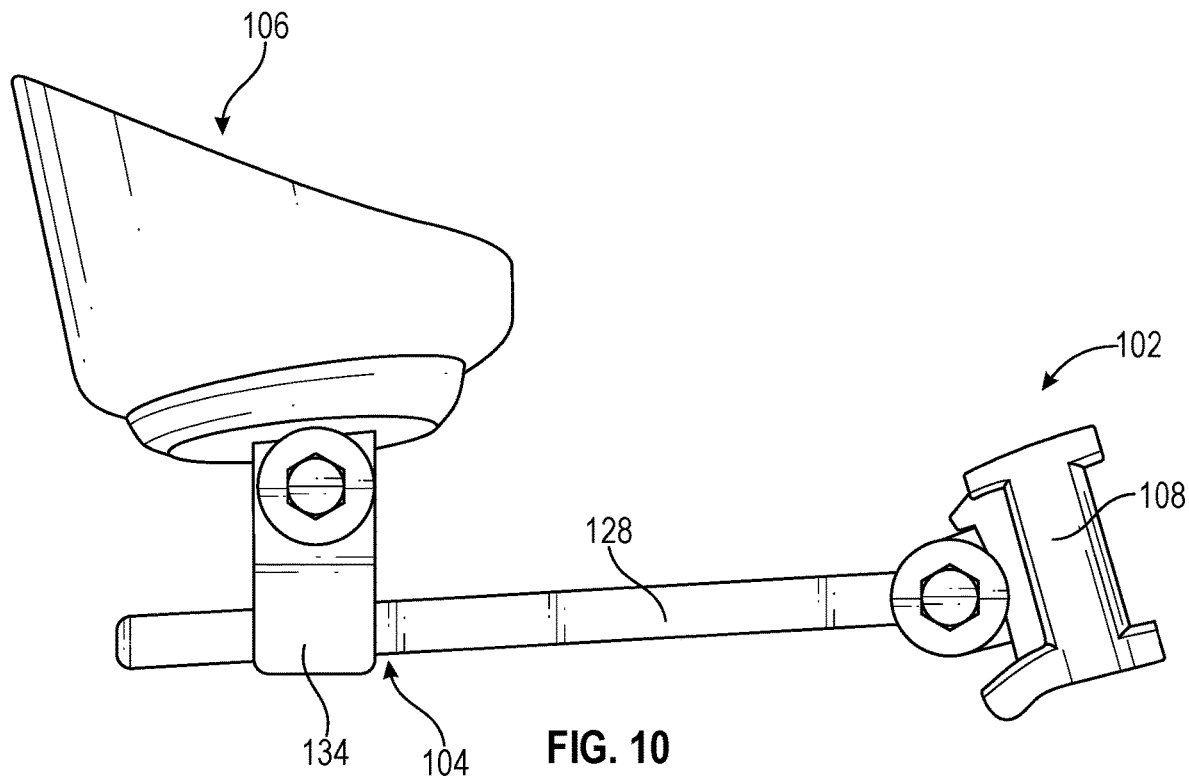
FIG. 10 illustrates a top plan view of an eye cover system with an eye cover portion in a second position.
Figure 11:
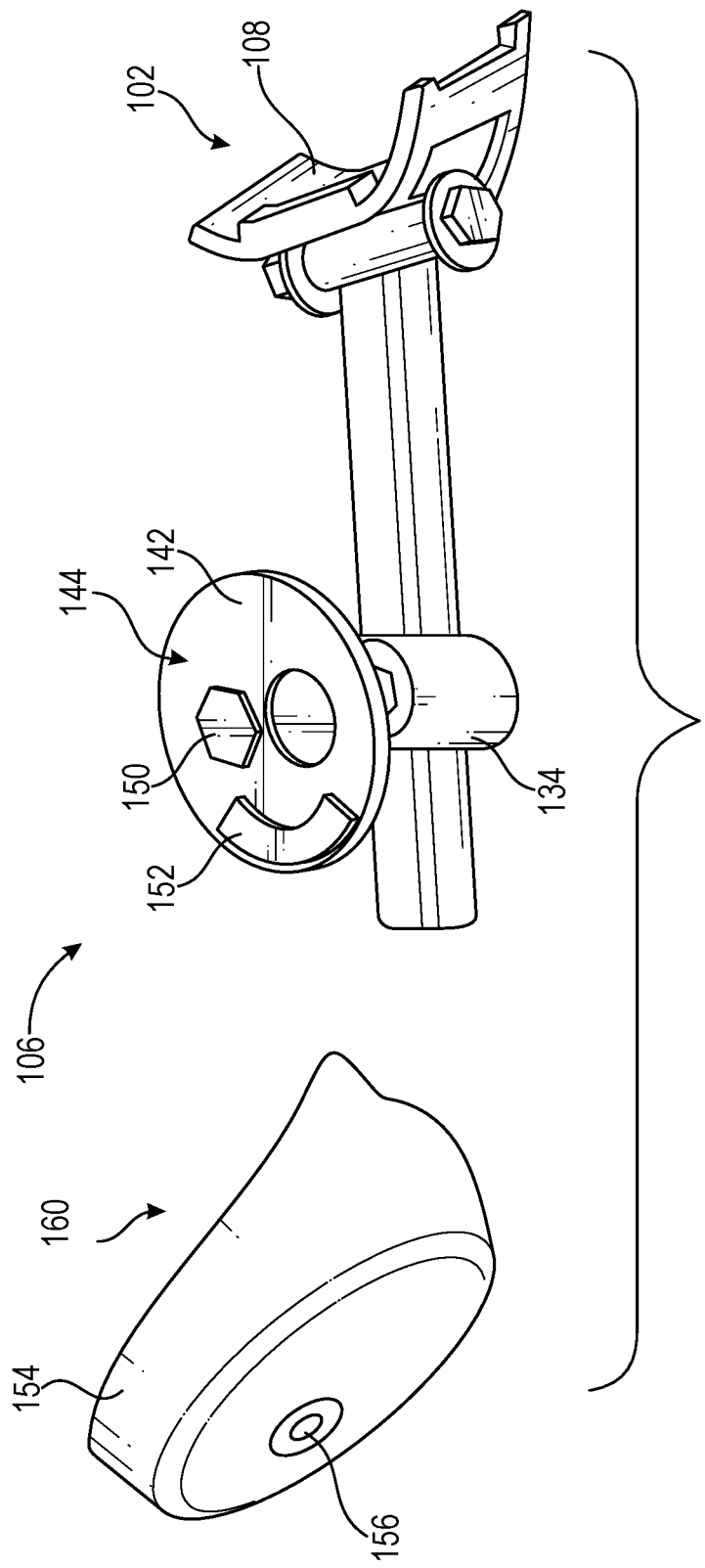
FIG. 11 illustrates a top perspective view of an eye cover system with an eye cover hood decoupled therefrom.
Figure 12:
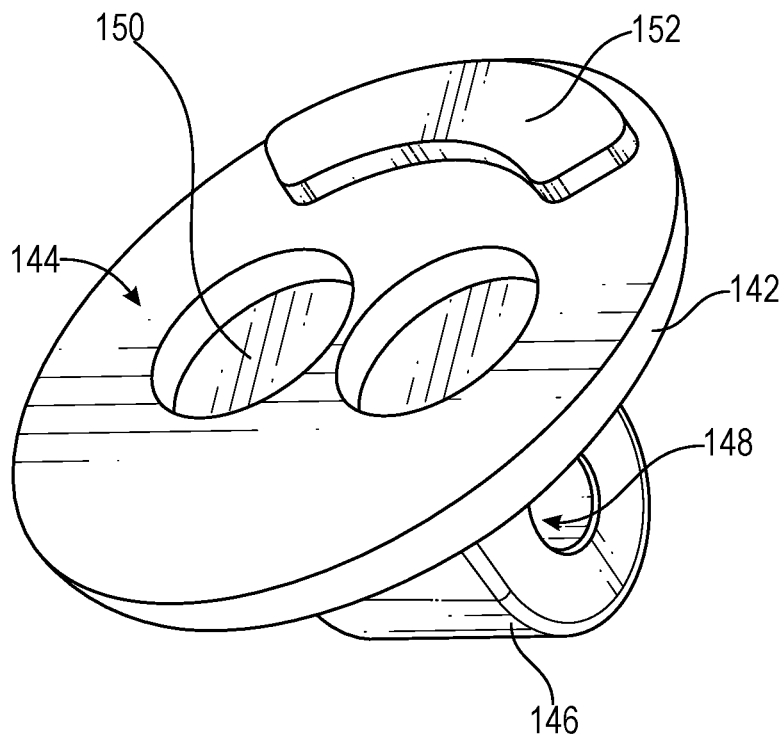
FIG. 12 illustrates a top perspective view of an adjustable hood attachment of an eye cover system.
Figure 13:
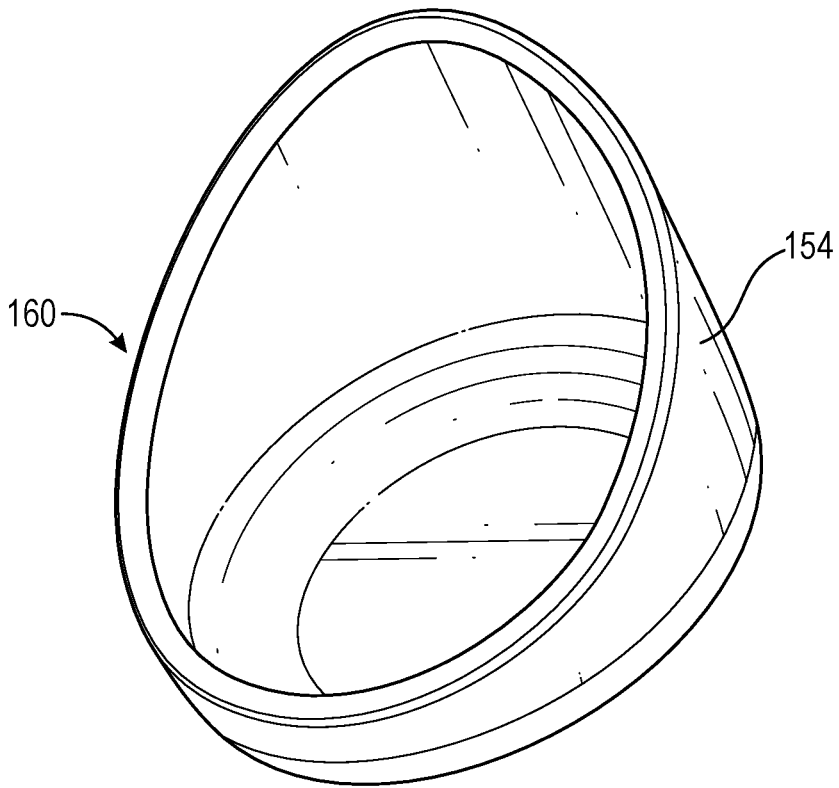
FIG. 13 illustrates a rear perspective view of an eye cover hood of an eye cover system.

It will be appreciated that the shaft 128 may pivot at least 180 degrees, allowing a range of adjustment for any user. While a hinge is shown (i.e., cylinder 130 coupled the first and second protrusions 118, 120 via a bolt 126), it will be appreciated that other mechanisms may be used, such as a ball and joint to increase adjustability. The adjustment portion 104 further comprises a slidably adjustable coupler 134 that receives the shaft 128 via a slide aperture 136 (FIG. 7), allowing the eye cover portion 106 to move linearly along the shaft 128 to adjust to the width between a user's eyes. In other words, the distance between eye cover portion 106 and the scope attachment portion 102 may be shortened (FIG. 9) or lengthened (FIG. 10) to accommodate a user's eye positioning. Referring back to FIG. 7, similar to the eyepiece coupler 108, the slidably adjustable coupler 134 comprises a first hood protrusion 137, a second hood protrusion 138, and a hood aperture 140 extending between the first and second hood protrusions 137, 138. It will be appreciated that there may be more than one protrusion and more than one aperture (shown in FIGS. 23-25). The first hood protrusion 137 comprises a first hood aperture 141A and a second hood protrusion 138 comprises a second hood aperture 141B.

As shown in FIGS. 11-14, the eye cover portion 106 comprises an adjustable hood attachment 142 that is hingedly coupleable to the slidably adjustable coupler 134. In particular, the adjustable hood attachment 142 comprises a hood cover receiving surface 144 on one side and a protrusion 146 (FIG. 12) on an opposite side. The protrusion 146 comprises a protrusion aperture 148 therethrough. Further, the protrusion 146 is positioned in the hood aperture 140 and interposed between the first and second hood protrusions 137, 138 (shown in FIG. 7), with a fastener 126 (e.g., a bolt) inserted through the first hood aperture 141A, the protrusion aperture 148, and the second hood aperture 141B. When the fastener 126 is inserted, the adjustable hood attachment 142 is allowed to pivot, depending upon the tightness of the bolt. In one embodiment, the adjustable hood attachment 142 may have a plurality of protrusions to be positioned into a plurality of apertures.

Figure 14:
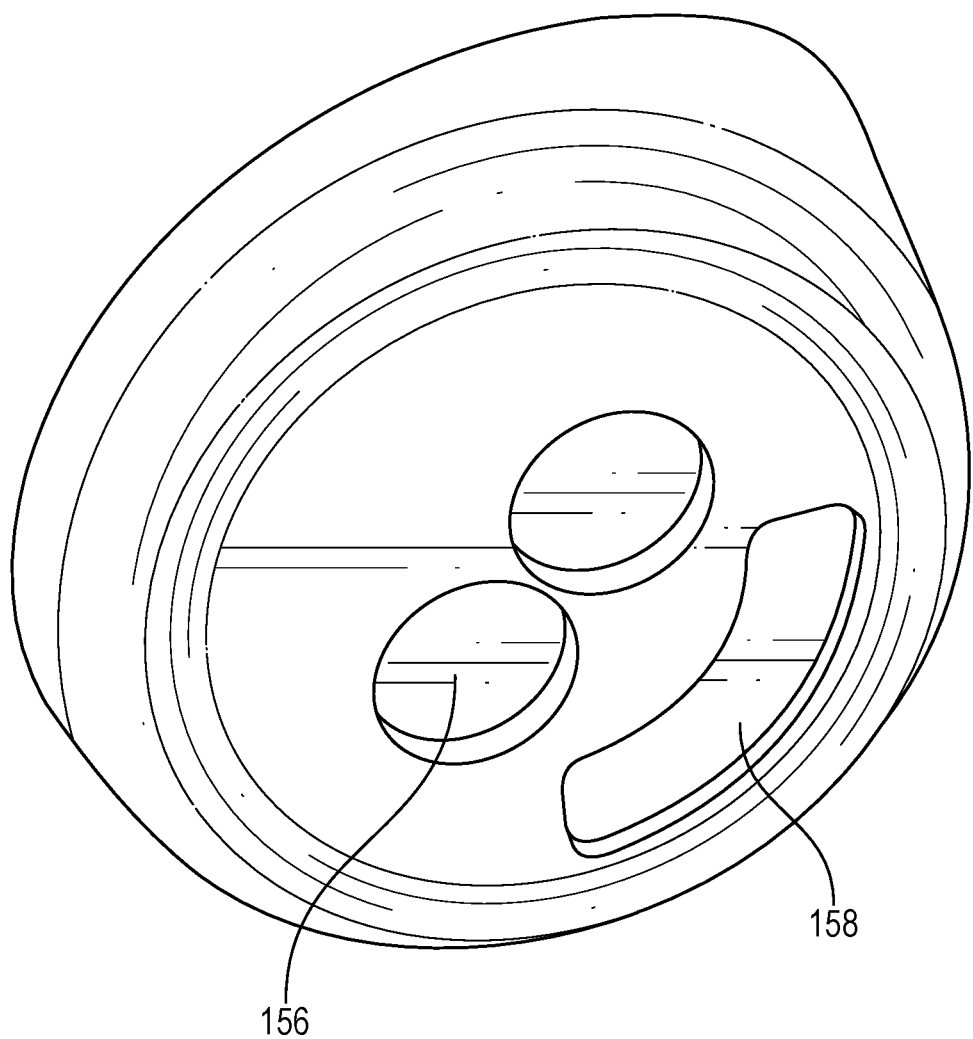
FIG. 14 illustrates a front perspective view of an eye cover hood of an eye cover system.

The hood cover receiving surface 144 may comprise at least one magnet 150 and a raised section 152. The at least one magnet 150 allows an eye cover hood 154 to be removably attachable thereto. Referring to FIG. 14, the eye cover hood 154 comprises at least two recessed portions that contain at least one hood magnet 156 to magnetically couple to the at least one magnet 150 of the hood cover receiving surface 144. The eye cover hood 154 further comprises a recessed section 158 to receive the raised section 152, which assists in correctly aligning the eye cover hood 154. Although one or more magnets 150, 156 are shown to couple the eye cover hood 154 to the hood cover receiving surface 144, it will be appreciated that other attachment mechanisms may be used, such as a twist attachment, hook and loop, spring-loaded button, a slide-on, etc.

Referring back to FIG. 13, the eye cover hood 154 comprises a curved, or contoured, portion 160 that complements the face of a user, thereby blocking the sunlight. The eye cover hood 154 may be a malleable material that may more easily conform to the facial features of a user. It will be appreciated that the hood 154 may be of any size, shape, or material. For example, the eye cover hood 154 may be smaller (e.g., smaller diameter) so that a child may use it and the shape of the hood may vary (e.g., no curved portion). The eye cover hood 154 allows for the ability to quickly attach and detach the hood 154 so that the spotting scope 112 will more easily fit in a backpack or in a case. It also prevents the eye cover hood 154 from being broken off the eye cover system. If it is caught, for example, on a user or a branch, the eye cover hood 154 will give way and be released (e.g., the magnets detach). It will also be appreciated that the at least one magnet 150 allows a user to customize the eye cover system 100. In particular, a user may use multiple eye cover hoods 154 that are different sizes, colors, and materials.

To use the eye cover system 100, a user would attach the eye coupler 108 to the spotting scope 112 by using the securement mechanism 114. The user would then look through the spotting scope 112 and adjust the eye cover portion 106 so that the unused eye is completely covered, preventing light from entering therein. In particular, the user would slide the slidably adjustable coupler 134 along the shaft 128 to find the correct spacing between the user's eyes. The bolt 126 may then be tightened to secure the eye cover portion 106 in position via the adjustment portion 104.

Figure 15:
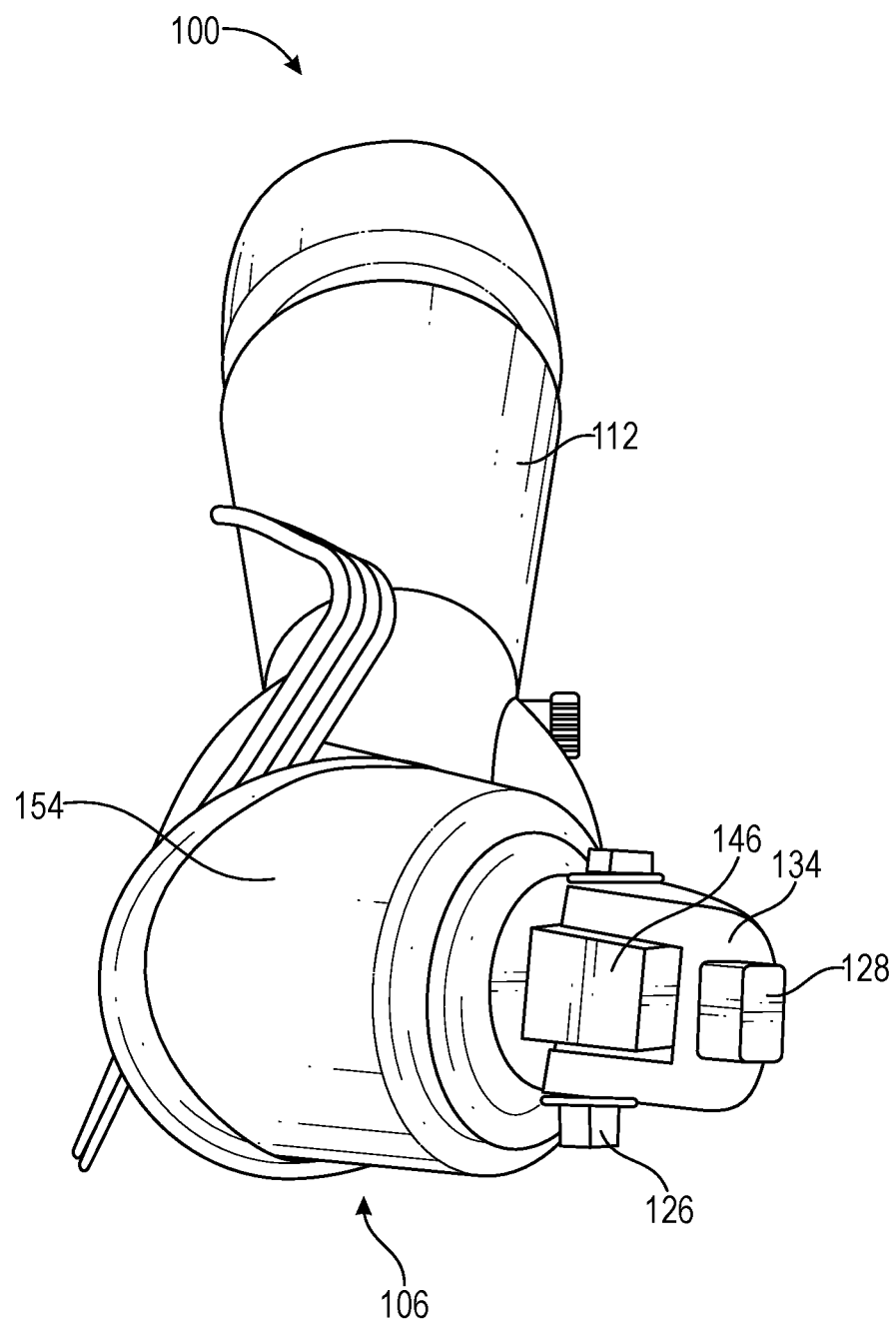
FIG. 15 illustrates a rear perspective view of an eye cover system in a closed position.
Figure 16:
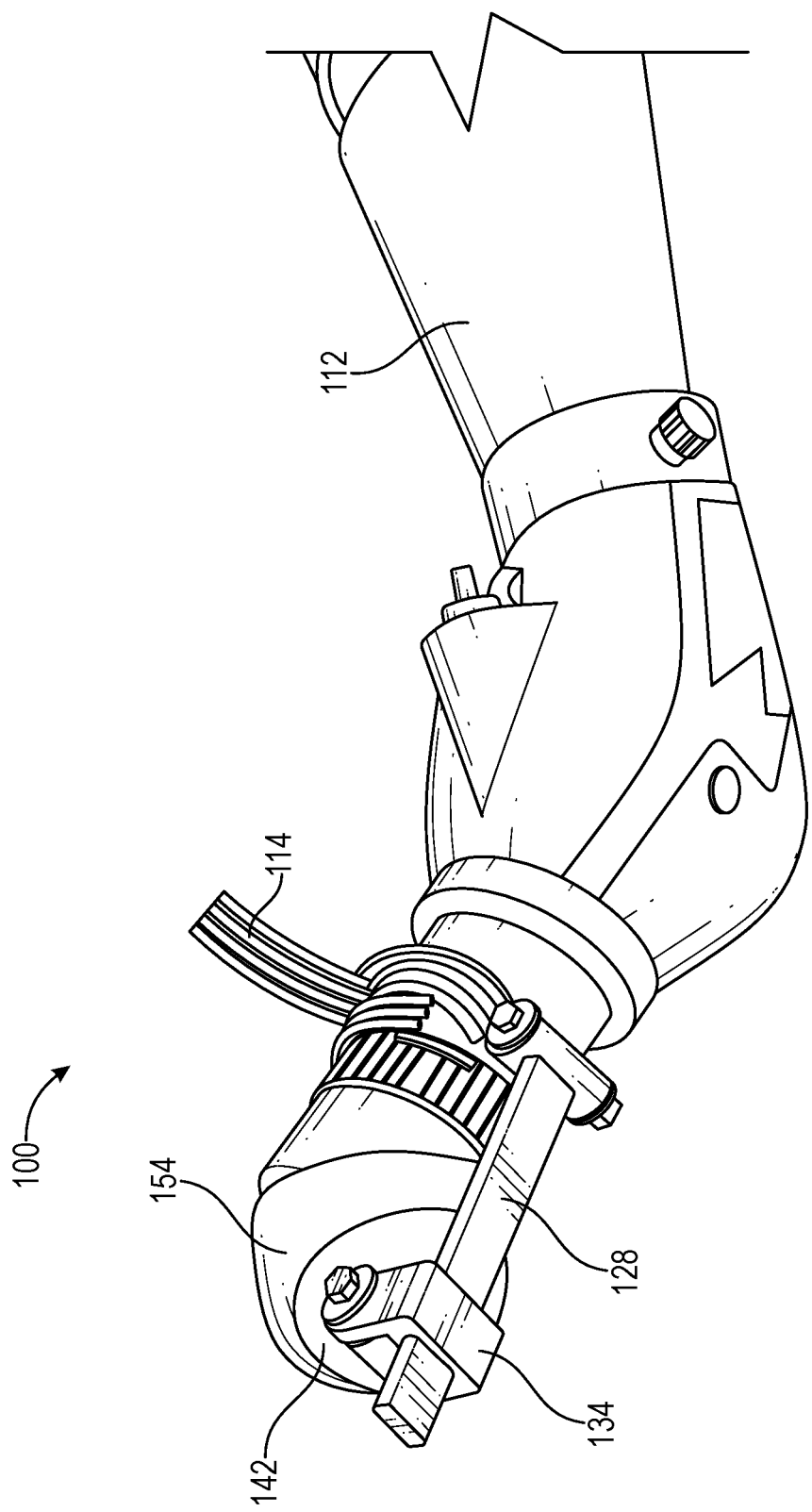
FIG. 16 illustrates a side perspective view of an eye cover system in a closed position.
Figure 17:
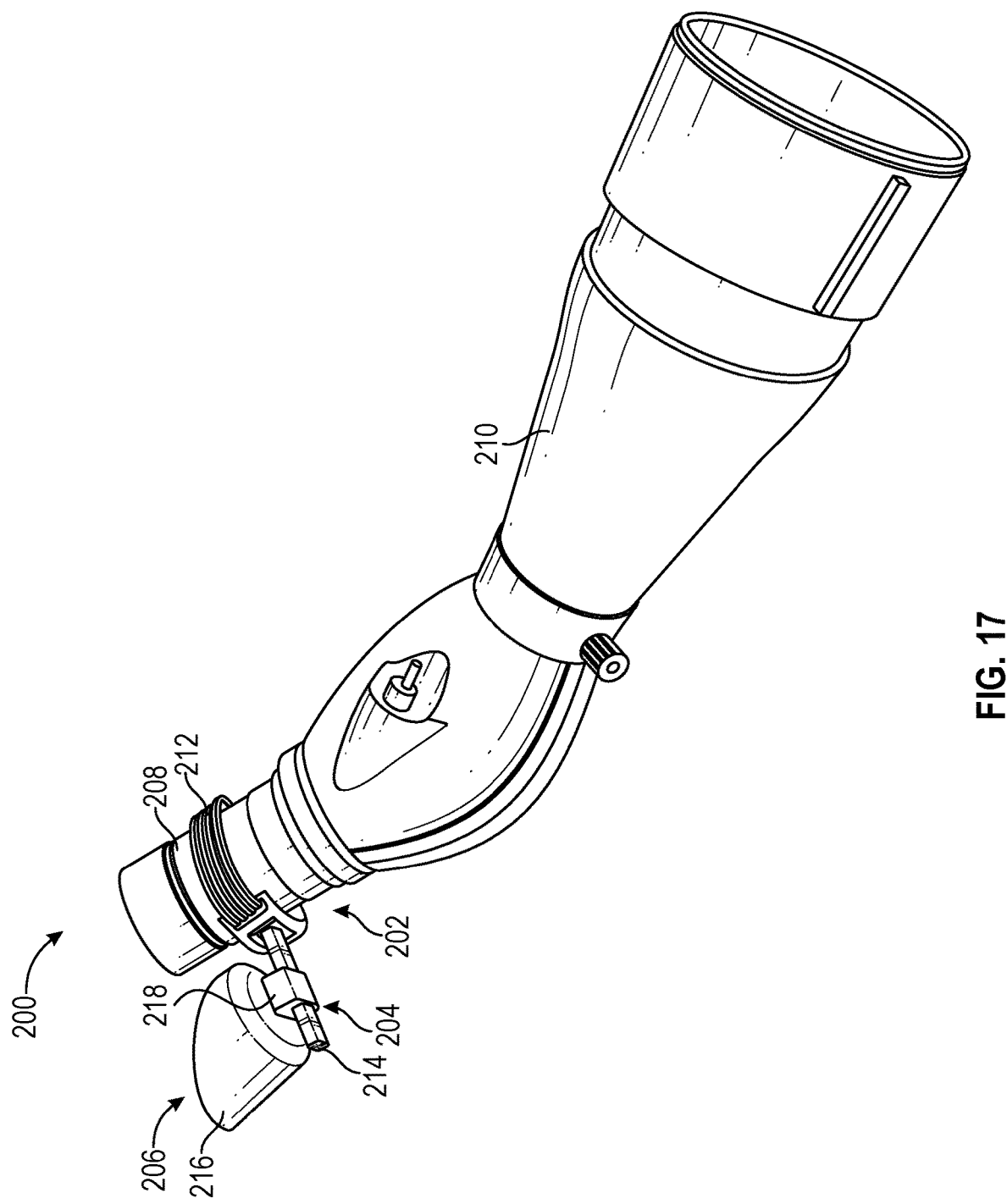
FIG. 17 illustrates a front perspective view of an eye cover system.
Figure 18:
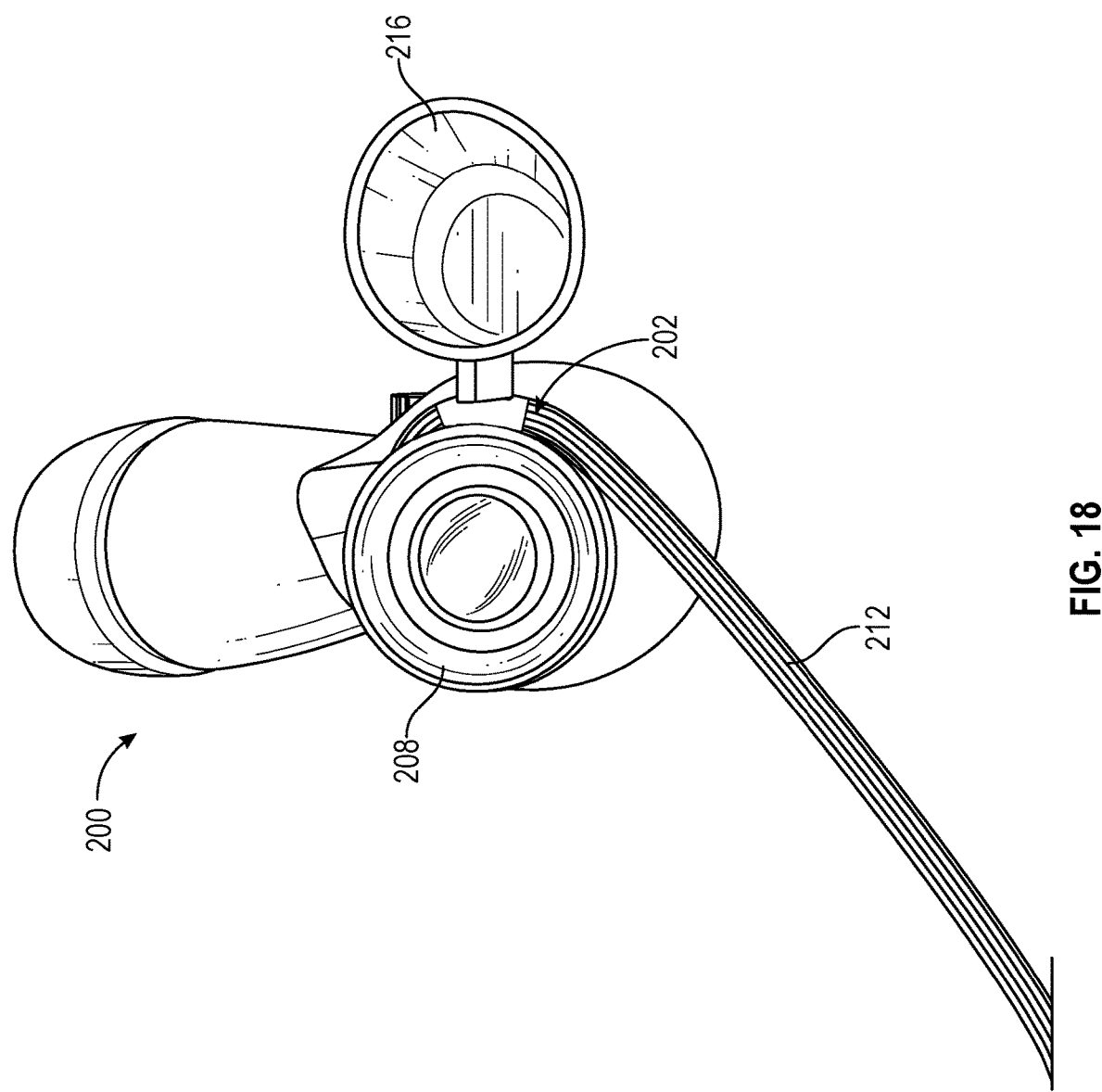
FIG. 18 illustrates a rear perspective view of an eye cover system.
Figure 19:
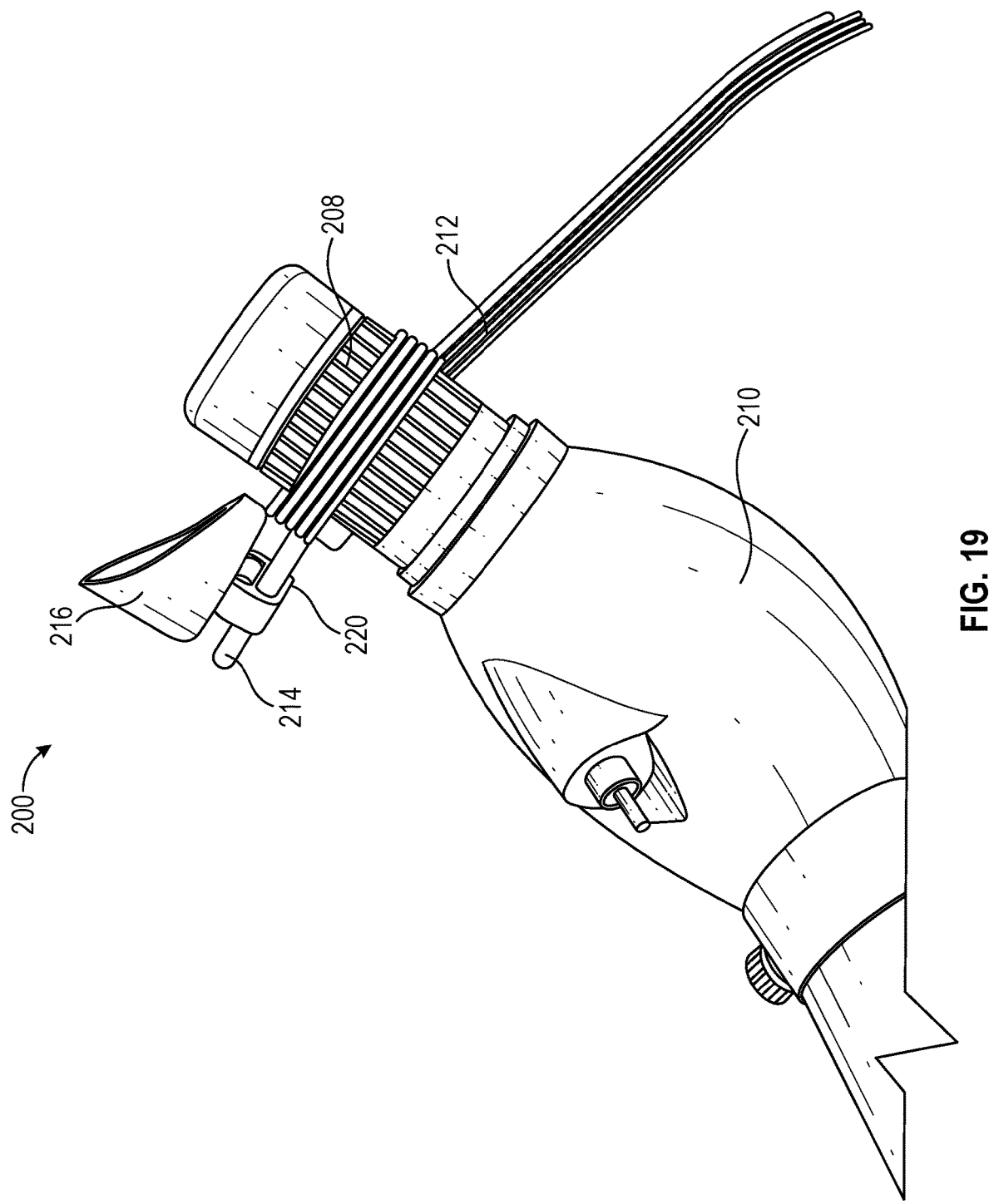
FIG. 19 illustrates a side perspective view of an eye cover system.
Figure 20:
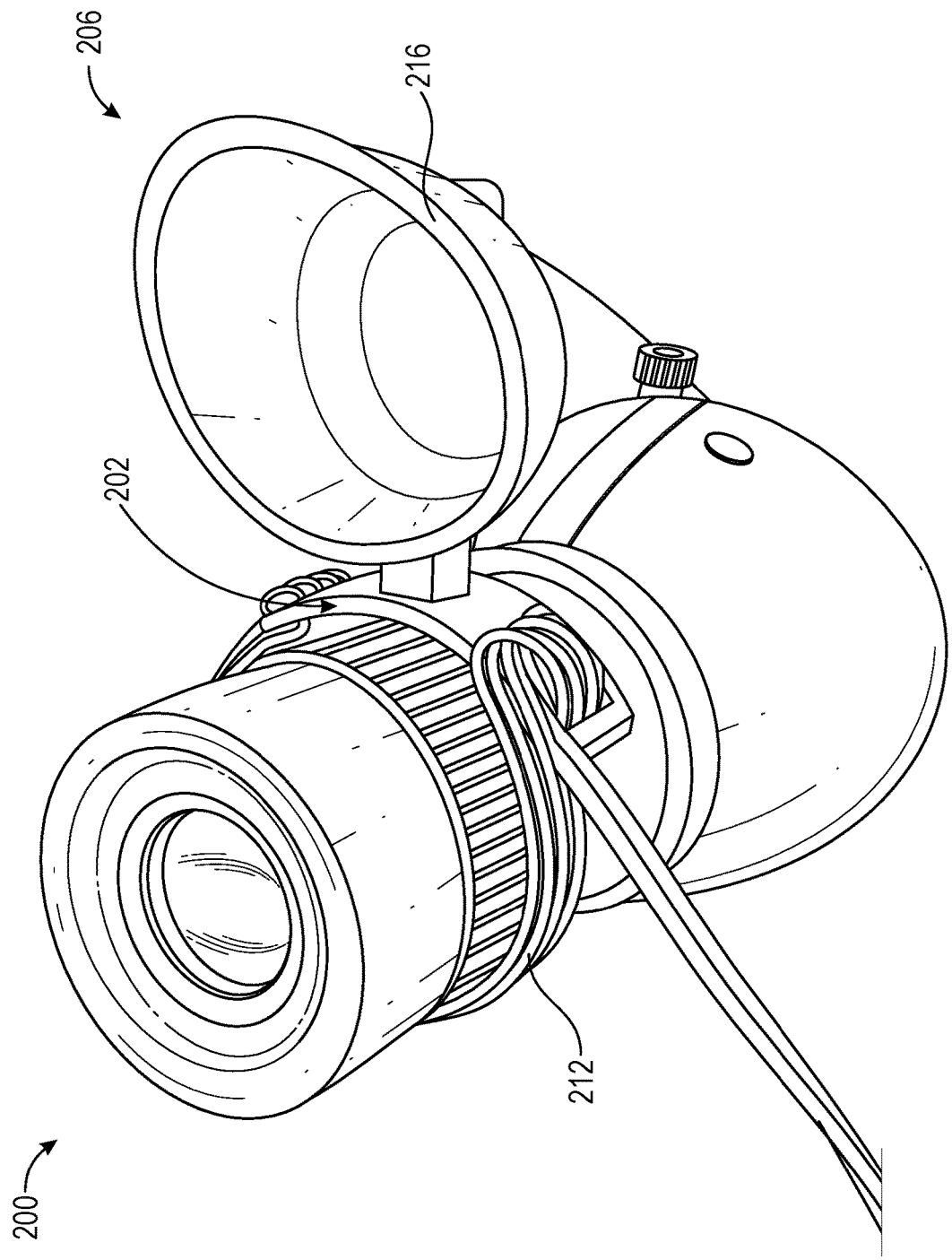
FIG. 20 illustrates a rear, bottom perspective view of an eye cover system.

In one method of use, illustrated in FIGS. 15-16, the eye cover system 100 may be adjusted to act as an eyepiece lens cover for a spotting scope, or any other type of scope. For example, the eye cover hood 154 may pivot, such as by loosening the bolts 126, and protect the eyepiece lens from dust, water, and being scratched.

Figure 21:
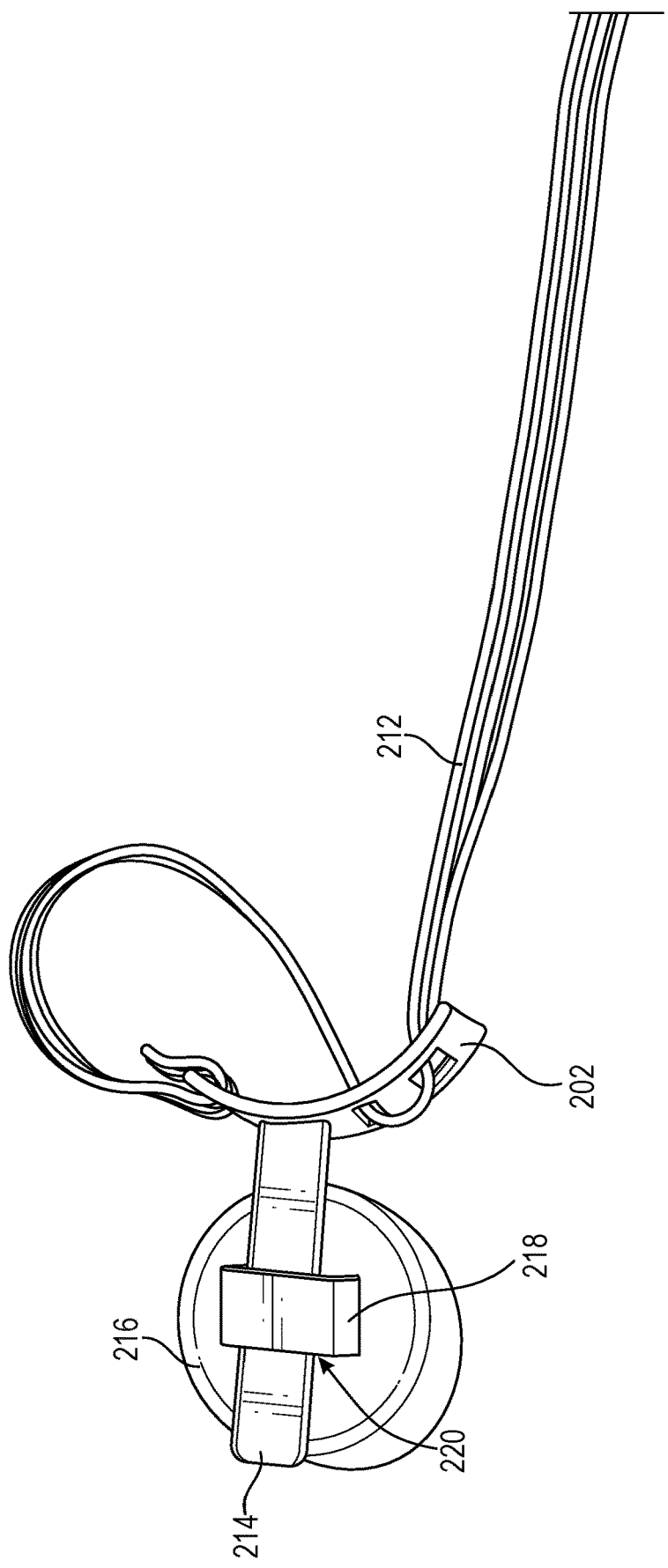
FIG. 21 illustrates a front, top perspective view of an eye cover system.

As shown in FIGS. 17-21, in one embodiment, an eye cover system 200 comprises a scope attachment portion 202, an adjustment portion 204, and an eye cover portion 206. The scope attachment portion 202 is arched so as to be received by a cylindrical eyepiece 208 of a spotting scope 210. The scope attachment portion 202 couples to the eyepiece 208 via an adjustable band 212 (e.g., an adjustable elastic band, strap, bracket, etc.). Further, the scope attachment portion 202 is coupled to a shaft 214 that receives the eye cover portion 206. The eye cover portion 206 comprises an eye cover hood 216 with a protrusion 218 that receives the shaft 214 through an aperture 220 (FIG. 21). The shaft 214 allows the user to adjust the eye cover hood 216, by sliding it thereon, in order to either narrow or widen the distance between the eye cover hood 216 and the spotting scope 210.

Figure 22:
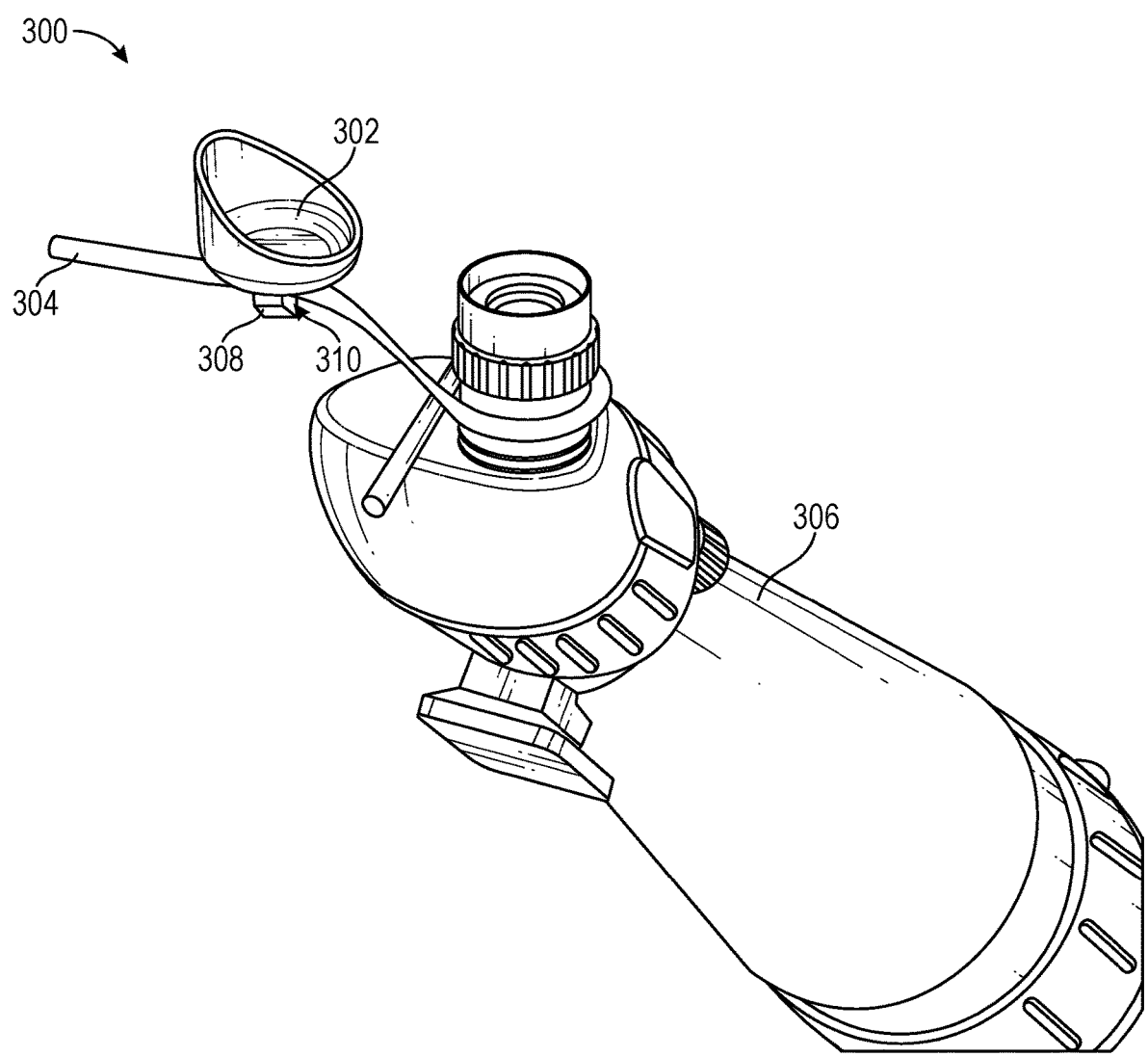
FIG. 22 illustrates a rear, bottom perspective view of an eye cover system.

As shown in FIG. 22, in one embodiment, an eye cover system 300 comprises a removably attachable hood 302 and an adjustment wire 304 that may wrap around and secure to a spotting scope 306. The removably attachable hood 302 comprises a protrusion 308 that receives the adjustment wire 304 through an aperture 310. The adjustment wire 304 allows the user to adjust the removably attachable hood 302 in order to either narrow or widen the distance between the removably attachable hood 302 and the spotting scope 306. It will be appreciated that the adjustment wire 304 allows adjustments in all directions, the wire of sufficient strength to remain in position once bent by a user, but may then be re-bent to a new position as well.

Figure 23:
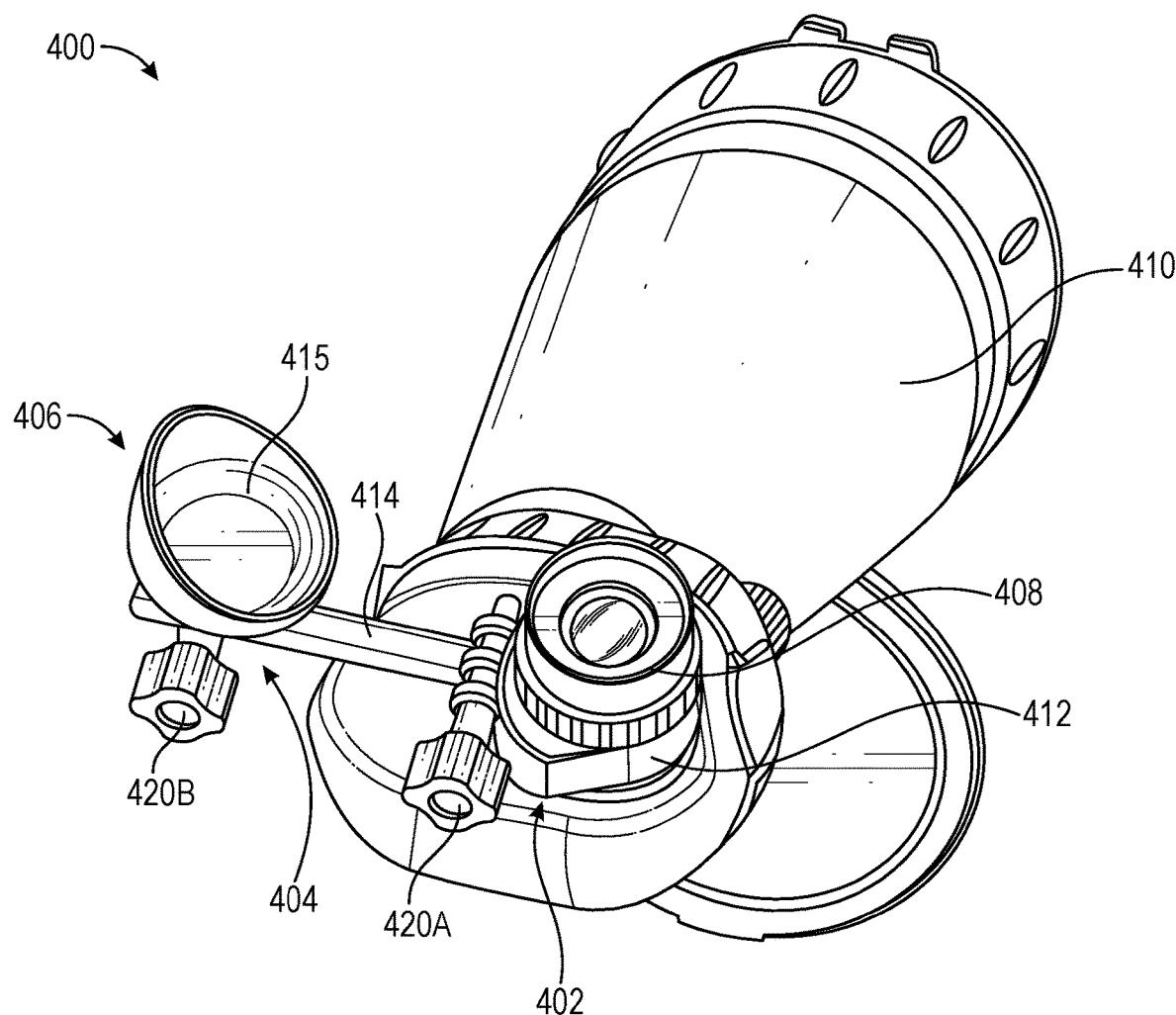
FIG. 23 illustrates a rear perspective view of an eye cover system.
Figure 24:
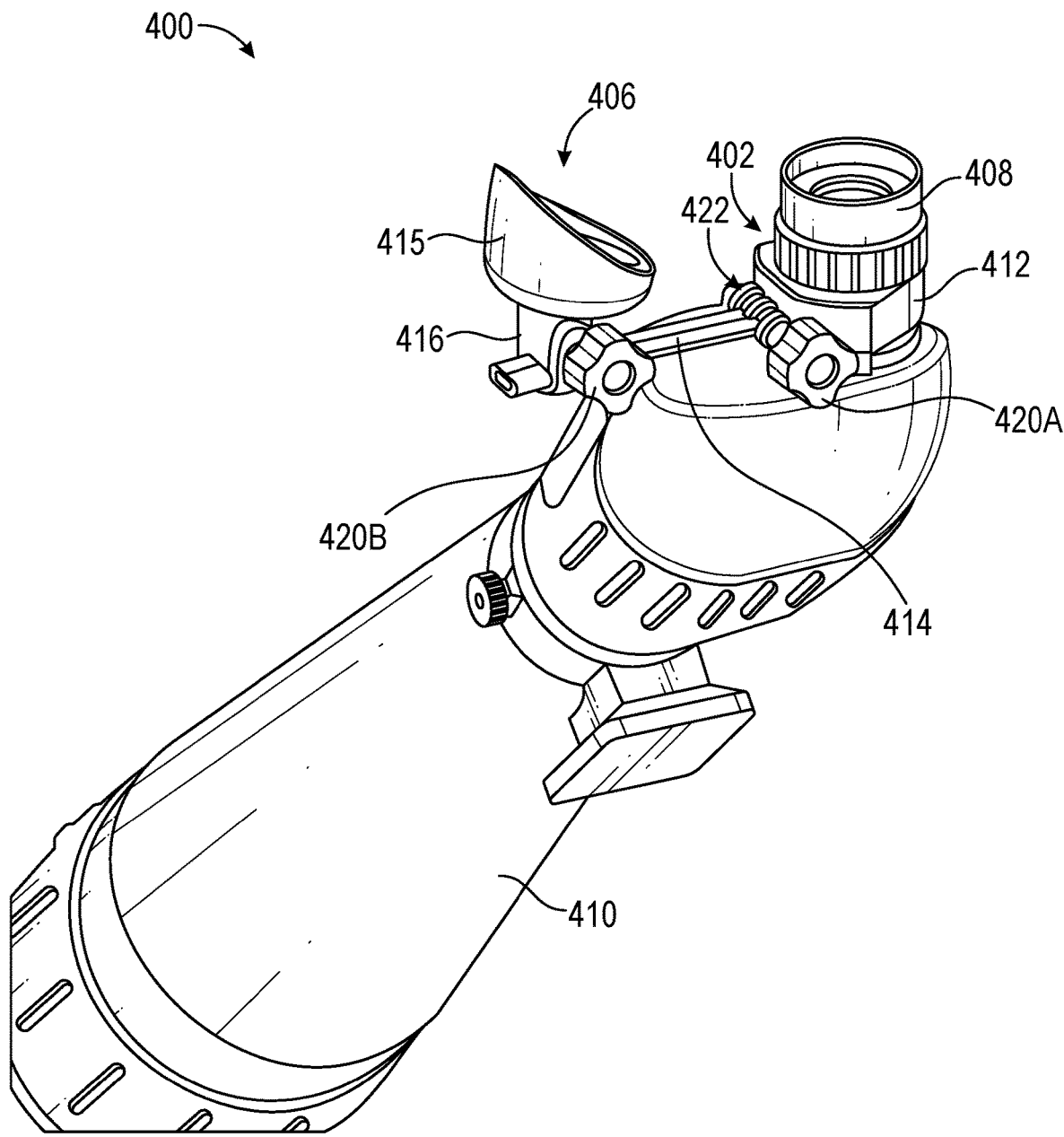
FIG. 24 illustrates a rear, bottom perspective view of an eye cover system.
Figure 25:
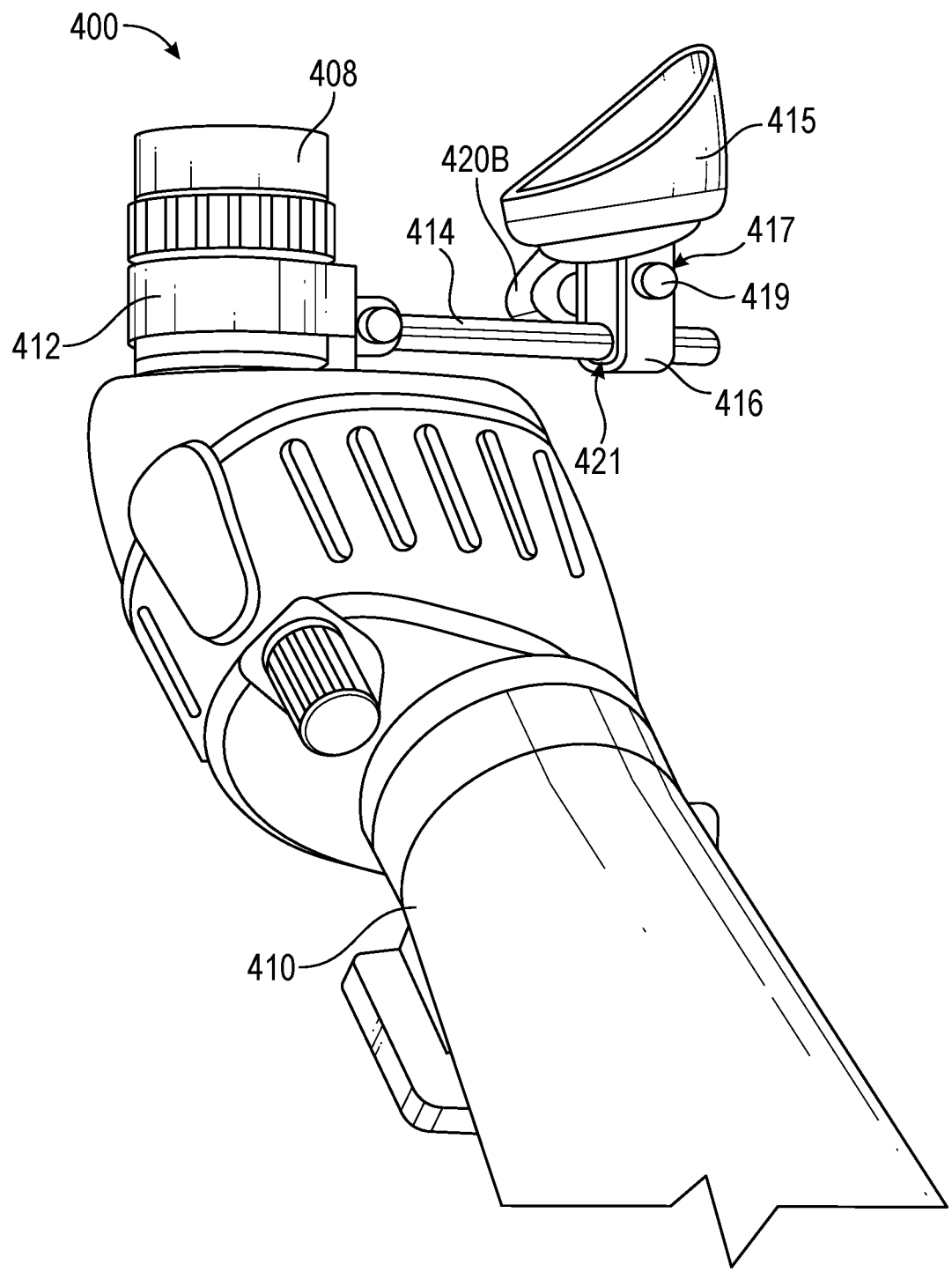
FIG. 25 illustrates a front, top perspective view of an eye cover system.

As shown in FIGS. 23-25, in one embodiment, an eye cover system 400 comprises a scope attachment portion 402, an adjustment portion 404, and an eye cover portion 406. The scope attachment portion 402 is, ideally, arched or cylindrical so as to receive a cylindrical eyepiece 408 of a spotting scope 410. The scope attachment portion 402 couples to the eyepiece 408 via an adjustable elastic band 412 or any other securement mechanism, such as hook and loop, straps, buckles, brackets with tighteners, etc. Further, the scope attachment portion 402 is coupled to a shaft 414 that receives the eye cover portion 406. As best seen in FIG. 25, the eye cover portion 406 comprises a hood 415 (which may or may not be removably attachable) with a protrusion 416 that comprises a first aperture 417 to receive a bolt 419 therethrough, providing for adjustment of the position of the hood 415. A second aperture 421 in the protrusion 416, receives the shaft 414, allowing it to slide thereon, depending upon the tightness of the bolt 419, which may be adjusted using knob 420B. The scope attachment portion 402 and the adjustable elastic band 412 may be combined into a single tightening band that may be adjustable using a threaded knob 420A. In other words, the user would place the adjustable elastic band 412 around the eyepiece 408 and then tighten it using threaded knob 420A so that it is secured to the eyepiece 408. The threaded knob 420A may also allow the user to quickly adjust the forward and backward position, relative to a user's eye, of the shaft 414. In other words, the interlocking fingers 422 allow the shaft 414 to pivot while the band 412 remains secure. When the knob 420A is tightened, the fingers are squeezed together (increasing tension), thereby prohibiting movement. An additional threaded knob 420B allows a user to quickly adjust the position of the eye cover portion 406 to get correct fit around the unused eye, allowing it slide on the shaft 414 and allowing the hood 415 to pivot.

The eye cover system 100, 200, 300, and 400 may be used on any of the following devices: hunting scopes, bird watching scope, gun scopes, science microscopes, military sniper spotter, shooting competition spotter, military scopes, telescopes, or other known devices. The eye cover system solves a problem that has been around for many decades, namely eye fatigue. The eye cover system is cost effective, relieves eye fatigue, and may be attached to any of the above devices, thereby making it useful to many industries.

It will also be appreciated that systems and methods according to certain embodiments of the present disclosure may include, incorporate, or otherwise comprise properties or features (e.g., components, members, elements, parts, and/or portions) described in other embodiments. Accordingly, the various features of certain embodiments can be compatible with, combined with, included in, and/or incorporated into other embodiments of the present disclosure. Thus, disclosure of certain features relative to a specific embodiment of the present disclosure should not be construed as limiting application or inclusion of said features to the specific embodiment unless so stated. Rather, it will be appreciated that other embodiments can also include said features, members, elements, parts, and/or portions without necessarily departing from the scope of the present disclosure.

Moreover, unless a feature is described as requiring another feature in combination therewith, any feature herein may be combined with any other feature of a same or different embodiment disclosed herein. Furthermore, various well-known aspects of illustrative systems, methods, apparatus, and the like are not described herein in particular detail in order to avoid obscuring aspects of the example embodiments. Such aspects are, however, also contemplated herein.

Exemplary embodiments are described above. No element, act, or instruction used in this description should be construed as important, necessary, critical, or essential unless explicitly described as such. Although only a few of the exemplary embodiments have been described in detail herein, those skilled in the art will readily appreciate that many modifications are possible in these exemplary embodiments without materially departing from the novel teachings and advantages herein. Accordingly, all such modifications are intended to be included within the scope of this invention.

What is claimed is:

1. A removably attachable eye cover system for a scope, comprising:
   an arched scope attachment portion configured to couple to a first exterior portion of a cylindrical eyepiece on the scope,
   an elastic band configured to extend around a second exterior portion of the cylindrical eyepiece not occupied by the arched scope attachment portion, the elastic band configured to secure the arched scope attachment portion to the cylindrical eyepiece, the cylindrical eyepiece interposed between the arched scope attachment and the elastic band,
   a plurality of interlocking fingers coupled to the arched scope attachment portion,
   a shaft pivotably coupled to the plurality of interlocking fingers,
   a first securing knob coupled to the plurality of interlocking fingers, the first securing knob configured to allow a user to pivot the shaft to a desired angle in relation to the cylindrical eyepiece, wherein in a first position the shaft is vertical and adjacent to the cylindrical eyepiece and in a second position the shaft is horizontal and perpendicular to the cylindrical eyepiece,
   a hood attachment comprising:
      a hood cover receiving surface comprising at least one magnet and a raised portion, and a protrusion comprising a first aperture configured to receive a bolt therethrough and a second aperture configured to receive and slide on the shaft, a hood comprising:

at least one hood magnet configured to magnetically couple the hood to the at least one magnet of the hood cover receiving surface, and a recessed portion configured to receive the raised portion of the hood cover receiving surface, and a second securing knob configured to secure a position of the hood.

2. The removably attachable eye cover system of claim 1, wherein the hood comprises a curved portion.

3. The removably attachable eye cover system of claim 1, wherein the scope attachment portion and the elastic band are combined into a single tightening band.

* * * * *